United States Patent
Campos et al.

(10) Patent No.: US 12,456,113 B2
(45) Date of Patent: Oct. 28, 2025

(54) SYSTEMS AND METHODS FOR LINKING BLOCKCHAIN WALLETS VIA ENTANGLED PARITY-TOKENS

(71) Applicant: pe3q technologies, inc., Las Vegas, NV (US)

(72) Inventors: Ted Campos, Las Vegas, NV (US); Brian Kip, Las Vegas, NV (US)

(73) Assignee: pe3q technologies, inc., Las Vegas, NV (US)

( * ) Notice: Subject to any disclaimer, the term of this patent is extended or adjusted under 35 U.S.C. 154(b) by 237 days.

(21) Appl. No.: 18/315,010

(22) Filed: May 10, 2023

(65) Prior Publication Data

US 2024/0378593 A1    Nov. 14, 2024

(51) Int. Cl.
*G06Q 20/36* (2012.01)
*G06Q 20/02* (2012.01)
*G06Q 20/38* (2012.01)

(52) U.S. Cl.
CPC ......... *G06Q 20/3674* (2013.01); *G06Q 20/02* (2013.01); *G06Q 20/389* (2013.01)

(58) Field of Classification Search
CPC .. G06Q 20/3674; G06Q 20/02; G06Q 20/389; G06Q 20/065; G06Q 20/363; G06Q 20/401; G06Q 20/405; G06Q 20/3678
See application file for complete search history.

(56) References Cited

U.S. PATENT DOCUMENTS

| | | | | |
|---|---|---|---|---|
| 2003/0223468 A1* | 12/2003 | Koga | ................... | H04N 21/435 370/537 |
| 2021/0073793 A1* | 3/2021 | Govindarajan | ...... | G06Q 20/367 |
| 2023/0334472 A1* | 10/2023 | Pene | ................. | G06Q 20/0655 |

OTHER PUBLICATIONS

Víctor Muñoz (@victormunoz), Josep Lluis de la Rosa (@pepl-luis7), Easy Innova (@easyinnova), "ERC-4950: Entangled Tokens [DRAFT]," Ethereum Improvement Proposals, No. 4950, Mar. 2022. (Year: 2022).*

(Continued)

*Primary Examiner* — Patrick McAtee
*Assistant Examiner* — Vincent I Idiake
(74) *Attorney, Agent, or Firm* — Aambell PC

(57) ABSTRACT

Embodiments of a method for verifying contents of multiple wallets in a blockchain network through linking the wallets via entangled parity-tokens is provided. The method comprises querying blockchain data based on parity-token identifiers to identify transactions minting a plurality of parity-tokens to a first wallet having the first wallet address, transferring the plurality of parity-tokens from the first wallet address to a second wallet having the second wallet address, and returning one of the plurality of parity-tokens from the second wallet address to the first wallet address, retaining another one of the plurality of parity-tokens in the second wallet address. Responsive to at least identifying the transactions, the method further comprises verifying contents in the second wallet using the second wallet address.

19 Claims, 20 Drawing Sheets

(56) References Cited

OTHER PUBLICATIONS

"A decentralized registry to protect your assets", Delegate Cash, retrieved from https://delegate.cash/ on May 2, 2023, 3 pages.
"Blockchain Infractructure for the Decentralised Web", Parity Technologies, retrieved from https://www.parity.io/ on May 2, 2023, 9 pages.
"How to link yoiur cold wallet to your VeeFriends Profile!", VeeFriends Blog, retrieved from https://blog.veefriends.com/how-to-link-your-cold-wallet-to-your-veefriends-profile-ecf3e1226b4b on May 2, 2023, 4 pages.

* cited by examiner

US 12,456,113 B2

SYSTEMS AND METHODS FOR LINKING BLOCKCHAIN WALLETS VIA ENTANGLED PARITY-TOKENS

TECHNICAL FIELD

The present disclosure relates to systems, techniques, and methods directed to linking blockchain wallets via entangled parity-tokens.

BACKGROUND

A blockchain is a decentralized, distributed digital ledger used to record transactions across many computing nodes (e.g., servers) in a network such that any ledger record cannot be altered retroactively (e.g., tampered), without alteration of all subsequent blocks on a majority of the computing nodes. As a result, blockchain technology can be useful in creating an immutable ledger that confirms data integrity, with built-in mechanisms to prevent unauthorized, unauthenticated transactions.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
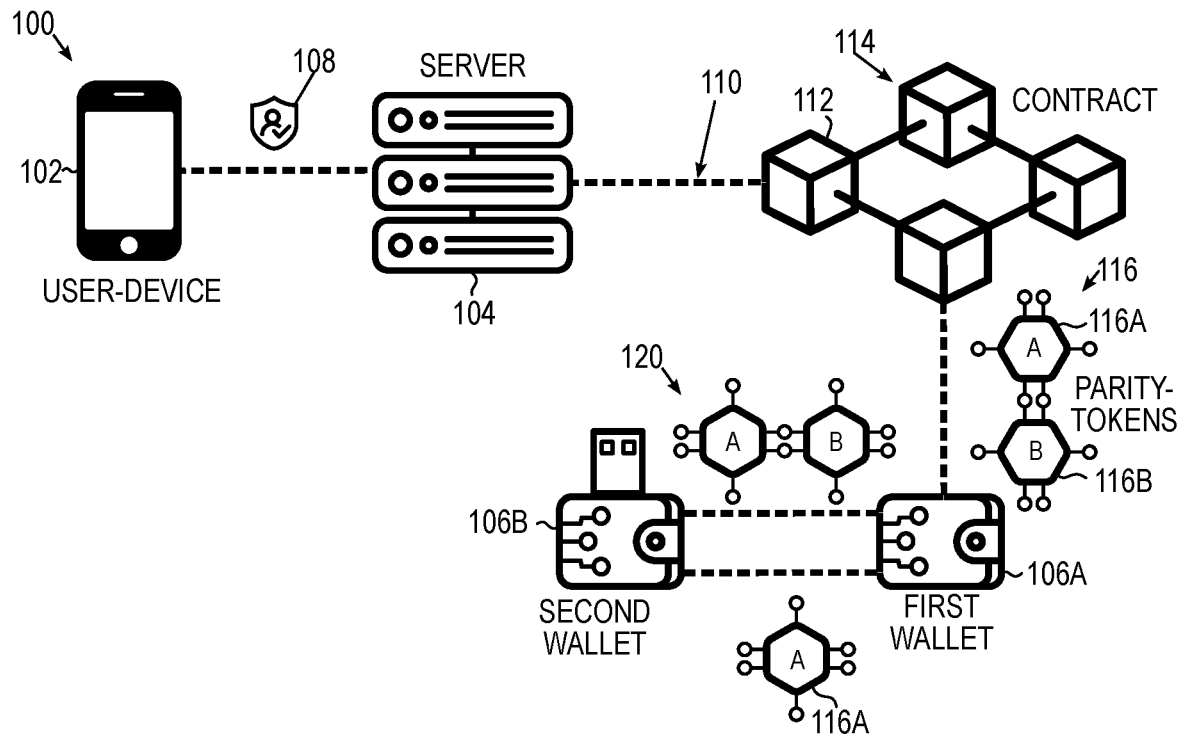
FIG. 1 is a simplified block diagram of an example system for linking blockchain wallets via entangled parity-tokens according to some embodiments of the present disclosure.

For purposes of illustrating the embodiments described herein, it is important to understand certain terminology and operations of blockchain networks. The following foundational information may be viewed as a basis from which the present disclosure may be properly explained. Such information is offered for purposes of explanation only and, accordingly, should not be construed in any way to limit the broad scope of the present disclosure and its potential applications.

A blockchain is a distributed ledger with growing lists of records, called blocks, securely linked together via cryptographic hashes. In general, each block contains a cryptographic hash of the previous block, a timestamp, and transaction data. Each block represents a transaction that is validated (e.g., verified) and recorded by a number of different nodes in a network, each node being a computing device. In other words, each node participating in the network holds an identical copy of the ledger, reflecting all past transactions in the blockchain. Transactions, identified by corresponding transaction identifiers (IDs), can be any movement of data in the blockchain network. Each transaction may be associated with certain transaction costs, payable to the validator nodes in the blockchain network as "gas fees." Examples of currently available blockchain networks include Ethereum™, Polygon™, Cardano™, and Bitcoin™. Different software applications (e.g., games, financial applications, etc.) may originate the transactions in the blockchain. These applications may run on a cloud network, originating transactions, and broadcasting them for verification to the blockchain network, which verifies and adds the transactions sequentially to the blockchain. Each blockchain network may support a different type of blockchain, differentiated, for example, by the format of the data structures representing each transaction and the function calls that perform actions on the data structures.

Generally, blocks in the blockchain may be associated with a data structure called a token. Certain tokens, such as cryptocurrency are fungible tokens, whereas certain others are non-fungible tokens (NFTs). The NFT acts as an irrevocable digital certificate of ownership and authenticity for a unique digital or physical asset, such as a piece of art, digital content, media, and event tickets. The tokens, whether fungible or non-fungible, are created and managed by contracts in the blockchain. The contract is code that is executed deterministically in the blockchain network; each node in the network validates the state-changing operations that the contract's code makes. The contract is generally identified by its contract address, which is assigned to the contract at the time it is generated in the blockchain network. For example, the contract address on the Ethereum network is a 20-byte hexadecimal string that is generated using a hash function. Other blockchains may use different formats or values to identify contracts.

Typically, the contract "mints" a token by executing a function that assigns the token to a particular owner, identified by a specific address in the blockchain network. A single contract having suitable variables, functions, and data structures, may be used to mint multiple tokens according to particular rules for token transfer and management. Each token thus minted will have a separate token ID within the contract. The token is stored in the contract as a data structure that maps the particular token ID to the corresponding blockchain address to which it has been assigned. The blockchain address serves as the owner ID of the token. When the token is transferred or traded, the token's data structure is updated on the blockchain to reflect the new ownership or transfer to a new owner ID.

A user may use a blockchain wallet to store the user's tokens. The blockchain wallet is code that runs on the blockchain network, functioning as a digital account to manage tokens by storing and tracking, for example, private and public keys and transactions associated with the user's network credentials (e.g., private keys, public keys) on the blockchain network. In cases where the token is transferred to the user's wallet, the owner ID of the token may be the public key of the wallet, which is also the wallet's address on the blockchain. The private key of the user is necessary to move content out of the wallet.

Blockchain wallets may be generally categorized into two types: online and offline. Online wallets, of which "public wallets" are examples, are typically software based and implemented by an application running on a computing device (e.g., desktop computer, mobile device, etc.) coupled to the Internet. Some such software wallets may be full-weight wallets that execute entirely on a single computing device; other such software wallets may be lightweight wallets that have a frontend executing on one computing device (such as a smartphone) and a backend executing on another, remote computing device (such as a server). Offline wallets, sometimes referred to as "cold storage", are generally implemented on a hardware device (e.g., a drive, Universal Serial Bus (USB) stick, etc.) that is disconnected from the Internet when not in use. Cold storage wallets therefore provide extra security by significantly reducing the chances of hacking or malware.

In a public blockchain network, all data in the blockchain is potentially visible to anyone. Determining whether, for example, an NFT has been transferred between two addresses involves parsing through the blockchain for the token ID of the NFT. Addresses associated with a transaction are recorded in the blockchain, but the transactions are regarded as anonymous. That is, there is no identifier of who owns or controls the address. Determining who owns a specific address with access to and control of the address requires more information. For example, a user may claim to own an NFT at a particular wallet address. A third-party (e.g., loan officer seeking the NFT as security, venue authenticator seeking verification of an NFT digital ticket, etc.) who wants to verify the ownership may parse the blockchain using a blockchain explorer or tool such as Etherscan™, OpenSea™ or Rarible™. This verifies that the NFT is associated with the particular wallet address. Determining that the user is the owner of the wallet address usually requires the user to create a signed transaction with the user's private key and to share that transaction with the third-party. For online wallets this is usually not an inconvenience. But cold storage wallets require them to be online to perform such a transaction, because creating and signing a transaction to verify that the user owns the cold storage cannot happen while the cold storage is offline.

In addition, authentication of one wallet is currently insufficient to automatically authenticate any others or verify the contents of other wallets owned by a single user. "Authentication" as used in blockchain systems and herein refers to a process of validating an account, such as the wallet, as belonging to a user, commonly by means of the user's public/private keys combination recognized by the blockchain network. The authentication process remains anonymous to the extent that it does not reveal the identity of the user, such as the user's name; it merely assures that the wallet is associated with a particular anonymous user who knows the wallet's public/private keys combination. Different wallets have necessarily different public/private keys combination, so that authentication of one wallet is currently not sufficient to authenticate any others. For example, a user may own a first wallet with a public/private keys combination, and a second wallet with a different public/private keys combination. To access the contents of the first wallet or the second wallet requires the user currently to login to the respective wallets separately using the public/private keys combination. Viewing the contents of the first wallet or the second wallet is possible by querying blockchain transactions if the respective wallet address is known, but there is no way currently to verify that both these wallets are owned by a common user. Thus, to verify that a particular NFT is present in the user's second wallet currently requires the user to authenticate the second wallet so that the NFT's presence therein can be verified.

Assume, merely for example purposes, that the user's second wallet is not readily available for various reasons, such as it is a cold storage wallet disconnected from the blockchain network, or it is for certain restricted business use whereas the first wallet is for personal use, or the private key has been forgotten, etc. Or perhaps the user simply wishes to only use the first wallet for a given period of time or for a given event. For example, the user's second wallet may contain important digital assets such as large sums of cryptocurrency, property titles/deeds, expensive/exclusive event tickets, education diplomas, business contracts, tax records, high value art certificates, expensive art NFTs, etc., that the user does not want to be accessible online readily. Currently, the user cannot view and/or verify the contents of the second wallet through the authenticated first wallet without separately authenticating the second wallet, or communicatively coupling the second wallet to the blockchain network. Indeed, linking the first wallet and the second wallet can also eliminate the need to transfer digital assets between wallets for verification purposes, serving also to eliminate gas fees associated with such transfers.

Accordingly, embodiments of the present disclosure facilitate efficient, effective, and fast verification of digital assets in multiple blockchain wallets using tokens entangled together by certain shared token attributes. In other words, the contents of multiple wallets can be verified (e.g., identified, parsed, viewed, read) through a single wallet by means of entangled parity-tokens. For example, an NFT in a user's offline cold storage wallet can be verified through the user's public wallet without the need for the cold storage wallet to be connected to the network according to embodiments of the present disclosure. In some embodiments described herein, NFTs are entangled, and parity established, via a series of specific transactions in the blockchain network. These "parity-tokens" are minted simultaneously from a single contract for this purpose. Such parity-tokens are different from fungible tokens, which are identical to each other and divisible. An example of a fungible token is an Ethereum token minted under ERC-20 standard, according to which, each fungible token is identical in type and value as another fungible token. However, the NFT, minted under a different standard, such as ERC-721, is different from such fungible tokens, in that each NFT is unique and cannot be identical to another token. Parity-tokens according to embodiments of the present disclosure are indivisible, unique, yet equal NFTs that share certain token attributes so that different wallets containing these parity-tokens can be linked together based on their "entangled" shared attributes.

In an example embodiment, a token creation platform executing in a cloud network connected to a blockchain network may mint a plurality of parity-tokens simultaneously from a contract to a first wallet of the user. In some embodiments, each of the parity-tokens may have a separate token ID while sharing a contract address of the contract and the transaction hash of the minting transaction. The parity-tokens are then transferred (via the blockchain) from the first wallet to a second wallet. In embodiments where the second wallet is a cold storage wallet, the second wallet may be temporarily connected to the blockchain network for this transaction. One of the parity-tokens is then transferred back (via the blockchain) to the first wallet. This sequence of transactions of the parity-tokens may form a "security sequence" serving to link the first wallet and the second wallet based on the simultaneous existence of the entangled parity-tokens in both wallets. Thereafter, in embodiments wherein the second wallet is a cold storage wallet, the second wallet may be disconnected and, in most cases, returned to its physically secure storage without breaking the link. Note that only the wallet address of the first wallet is provided to the token creation platform. No permission to access contents of the first wallet is granted; nor does the process give the token creation platform any other type of control of the first wallet. In other words, the process non-custodializes user credentials, so that credentials to access the first wallet are not requested or provided at any time. Thus, the token creation platform has zero control over any wallet, public or private.

Querying the transactions in the blockchain can verify that the security sequence is unbroken, that is, the sequence consists of (i) transfer of the plurality of parity-tokens from the first wallet address to the second wallet address and (ii) return of one of the parity-tokens back to the first wallet address without any other intervening or additional transactions. In other words, the presence of any other transaction in the blockchain for any one of the parity-tokens can invalidate the security sequence and consequently the authentication.

After the wallets are linked together via the parity-tokens, verifying whether the user owns the NFT held in the second wallet may involve examining the blockchain to confirm that the security sequence associating the first wallet and the second wallet was completed suitably, so that at least one parity-token exists at the first wallet, and another exists at the second wallet. This state of the blockchain authenticates the user's control over both wallet addresses without any need for the second wallet to be communicatively coupled to the blockchain network at the time of authentication. Any tampering (e.g., moving) of any one of the parity-tokens reflects as a transaction in the blockchain, which invalidates the security sequence and breaks the link between the first wallet and the second wallet.

Additionally, authentication of the second wallet can be performed by authenticating only the first wallet and "peeking" into its contents without any need to physically couple the second wallet to the blockchain network or to separately authenticate the second wallet. A search in the blockchain for the second wallet address identified from the blockchain of the parity-token in the first wallet can allow a "peek" into the second wallet contents, verifying the location of the NFT at the second wallet address, confirming the user's ownership of the NFT in question. As any transaction involving the NFT will necessarily reflect in the blockchain, that a last and final transaction associated with the NFT consists in moving it to the second wallet address confirms that the user who owns the second wallet also owns the NFT.

Each of the structures, methods, and systems of the present disclosure may have several innovative aspects, no single one of which is solely responsible for all the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm.

The term "cloud network" means a network of computing devices coupled together in a public, private, or hybrid communications network. Communication in the cloud network may use one or more wired, wireless, broadband, radio, and other kinds of communicative means. The Internet is an example of a cloud network. A subset of the computing devices in the cloud network may be employed in the blockchain network, for example, to participate in and/or validate transactions of the blockchain.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale.

In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments.

Further, unless otherwise specified, the structures shown in the figures may take any suitable form or shape according to various design considerations, manufacturing processes, and other criteria beyond the scope of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1 is a schematic block diagram of an example system 100 according to some embodiments of the present disclosure. System 100 may include a user-device 102, a server 104, a first wallet 106a and a second wallet 106b in a blockchain network 110. Blockchain network 110 may be any type of public, private, or hybrid blockchain network, including Ethereum™, Polygon™, etc. within the broad scope of the embodiments. First wallet 106a and second wallet 106b may comprise any suitable type of wallet (i.e., software, hardware, etc.) within the broad scope of the embodiments. In some embodiments, first wallet 106a may be a public wallet (e.g., an online wallet) and second wallet 106b may be a cold storage wallet (e.g., a hardware wallet). In other embodiments, both first wallet 106a and second wallet 106b may be online wallets. In yet other embodiments, both first wallet 106a and second wallet 106b may be cold storage wallets.

In various embodiments, first wallet 106a and second wallet 106b may comprise any suitable wallet application, such as MetaMask™, Zengo™, Electrum™, etc. within the broad scope of the embodiments. The wallet applications may be standalone applications executing in user-device 102 entirely (e.g., full-weight wallets) in some embodiments. In other embodiments, the wallet applications may be lightweight applications with a frontend at user-device 102 and a backend at a server (not necessarily server 104) in the cloud network. In some embodiments, the wallet applications may be browser plugins configured to execute in any type of computing device suitably, for example, in a smartphone, or desktop computer. In embodiments of cold storage wallets, the wallet applications may be encoded in the hardware devices suitably. In some such embodiments, a client interface may execute in user-device 102 and a backend may execute in the hardware device.

Server 104 may comprise any suitable computing device, including a plurality of servers, or virtual machines in a cloud network, or other suitable infrastructure configured to perform various operations as described herein. User-device 102 may be a smartphone or other suitable computing device that permits the user to communicatively couple to blockchain network 110. In some embodiments, a wallet application (such as MetaMask™) executing in user-device 102 may facilitate coupling first wallet 106a (or second wallet 106b) to server 104 suitably.

User-device 102 may allow server 104 to communicatively couple to first wallet 106a of a user with a signed transaction 108 in blockchain network 110. In various embodiments, signed transaction 108 may be signed from user-device 102 using a private key of first wallet 106a, authenticating the signer as one who has access to and control of first wallet 106a. Signed transaction 108 may include a wallet address of first wallet 106a. The wallet address serves as a network identifier of first wallet 106a in blockchain network 110. In some embodiments, the wallet address is a hexadecimal hash. Any suitable unique network identifier may be used for the wallet address within the broad scope of the embodiments. Note that signed transaction 108 merely facilitates providing the wallet address of wallet 106a to server 104. It does not give server 104 permission to access contents of wallet 106a; nor does it give server 104 any other type of control of wallet 106a. In other words, user credentials are not custodialized, so that credentials to access wallet 106a are not requested or provided to server 104 by user-device 102. Thus, server 104 does not get any custodial rights over user credentials of wallet 106a (or any other wallet, including wallet 106b) in blockchain network 110 and has zero control over any such wallet. Additionally, no relational information connecting user-device 102 (or user credentials if any) to wallet 106a is stored permanently in server 104.

Server 104 may access a contract 112 identified by a contract address 114. In various embodiments, contract address 114 is a hexadecimal hash assigned by blockchain network 110 to contract 112 at the time of creation of contract 112. In some embodiments, contract address 114 may be in a format different from a hexadecimal hash. Any suitable unique identifier of contract 112 in blockchain network 110 may be used as contract address 114 within the broad scope of the embodiments.

Server 104 may mint a plurality of parity-tokens 116 to first wallet 106a such that all individual parity-tokens in plurality of parity-tokens 116 share a common ID. In various embodiments, minting parity-tokens 116 comprises: (i) assigning tokens in contract 112 to the wallet address of first wallet 106a and (ii) broadcasting the minting transaction to blockchain network 110, which may (iii) validate the transaction suitably, and (iv) add it to a blockchain of blockchain network 110. When the minting transaction is added to the blockchain, a hexadecimal transaction hash is assigned to the transaction. The transaction hash serves as a unique transaction ID of the particular transaction in blockchain network 110.

In the example embodiment shown, plurality of parity-tokens 116 includes two parity-tokens 116a and 116b. Plurality of parity-tokens 116 may include any plural number of parity-tokens as desired and based on particular needs. Minting plurality of parity-tokens 116 simultaneously from the same contract 112 in a common transaction allows a combination of contract address 114 and transaction hash of the minting operation to serve as the common ID shared by individual parity-tokens in plurality of parity-tokens 116 (i.e., common ID=[contract address, transaction hash]). In some embodiments, a single contract may be used just once to mint plurality of parity-tokens 116, so that the common ID is contract address 114 alone. In such embodiments, additional minting transactions may use different contracts and correspondingly different contract addresses. Any suitable common ID, such as names, labels, hexadecimal hashes, etc. may be used as the shared common ID in plurality of parity-tokens 116 within the broad scope of the embodiments disclosed herein.

In various embodiments, the plurality of parity-tokens 116 may be transferred from first wallet 106a to second wallet 106b, for example, via a wallet application user-interface to perform the transfer. In some embodiments, for example, in which second wallet 106b is a cold storage wallet, the cold storage wallet may be communicatively coupled to blockchain network 110 suitably during the transfer, for example, by way of connecting to user-device 102 (or other computing device). Thereafter, one parity-token (e.g., 116a) in plurality of parity-tokens 116 may be transferred back to first wallet 106a (e.g., using the wallet application user-interface), retaining at least another of plurality parity-tokens 116 (e.g., 116b) in second wallet 106b, completing a security sequence 120.

Server 104 may thereafter query transactions in blockchain network 110 to verify security sequence 120. When a determination is made that security sequence 120 was completed without any intervening or additional transactions involving plurality of parity-tokens 116, server 104 may authenticate second wallet 106b, thereby linking first wallet 106a with second wallet 106b. Authenticating comprises confirming that second wallet 106b exists and is associated with first wallet 106a through a common owner-user. The confirmation that second wallet 106b exists may be by identifying wallet addresses of first wallet 106a and second wallet 106b in transactions of security sequence 120.

First wallet 106a and second wallet 106b may be associated through the common owner-user. The common owner-user may be identified by a private key of first wallet 106a as provided by signed transaction 108. The successful completion of security sequence 120 serves to authenticate that the common owner-user owns (i.e., has access to and control of) first wallet 106a and second wallet 106b. This follows from the initial permission in signed transaction 108 given by user-device 102 to server 104, which provides server 104 with the wallet address of first wallet 106a, confirming access to and control of first wallet 106a by the signer, presumably the owner-user. Further, transfer of one parity-token 116a in plurality of parity-tokens 116 from second wallet 106b back to first wallet 106a confirms the owner-user's access to and control over second wallet 106b. Thus, completion of security sequence 120, comprising the transfer of plurality of parity-tokens 116 from first wallet 106a to second wallet 106b and return of one parity-token in plurality of parity-tokens 116 back to first wallet 106a confirms the owner-user's access to and control over both first wallet 106a and second wallet 106b.

Linking comprises an association of the wallet addresses of linked wallets 106 whereby any one of the linked wallet addresses can be used to identify all the other linked wallet addresses. Thereafter, to verify (e.g., confirm, check, prove, attest) contents of all (or any) linked wallets 106, transactions may be queried using any one of the linked wallet addresses. In other words, only one linked wallet address need be used to verify the contents of all linked wallets 106. Thus, by linking first wallet 106a with second wallet 106b, only one of wallets 106 may be communicatively coupled to blockchain network 110 for purposes of verifying contents in both (or any one of them). This concurrent linking is possible because of the simultaneous existence of plurality of parity-tokens 116 in linked wallets 106 (e.g., first wallet 106a and second wallet 106b). The common ID shared by individual ones in plurality of parity-tokens 116 facilitates querying the transactions for wallet addresses associated therewith, allowing linked wallets 106 to be easily found and their contents verified as desired and based on particular needs.

Figure 2:
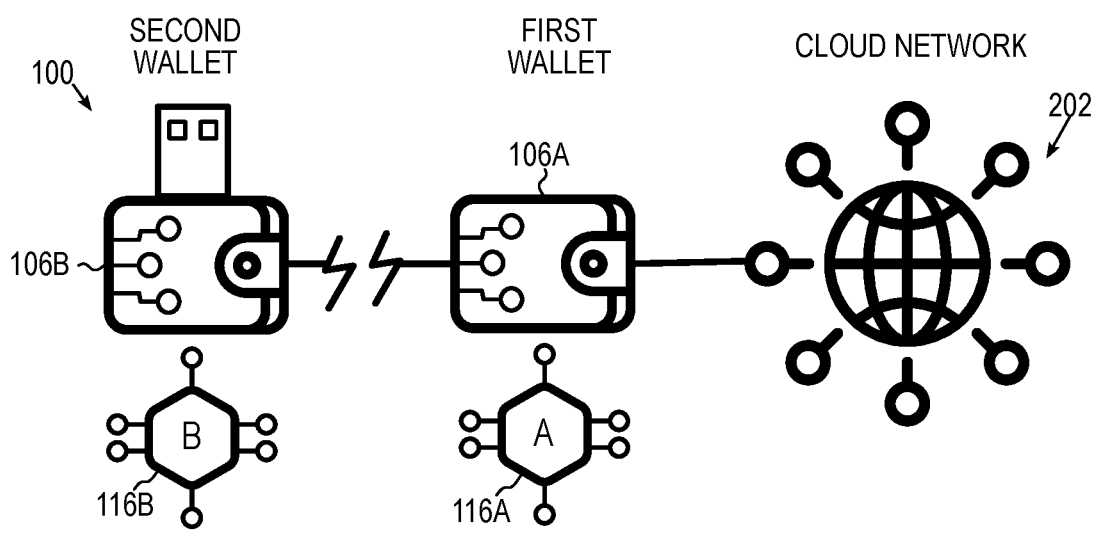
FIG. 2 is a simplified block diagram of example wallets in the system for linking blockchain wallets via entangled parity-tokens according to some embodiments of the present disclosure.

FIG. 2 is a schematic block diagram of wallets in system 100. First wallet 106a may be communicatively coupled to a cloud network 202 so that transfer from and to first wallet 106a can be conveniently performed online at any time. In various embodiments, first wallet 106a may be a public wallet. Second wallet 106b may be communicatively coupled to first wallet 106a only temporarily, for example, during transfer of parity-tokens 116 to second wallet 106b and subsequent transfer of parity-token 116a from second wallet 106b to first wallet 106a. In various embodiments, second wallet 106b may be a private wallet, a cold storage wallet, etc. After transfer of parity-token 116a from second wallet 106b back to first wallet 106a, second wallet 106b may be disconnected from first wallet 106a. In various embodiments, second wallet 106b may be temporarily communicatively coupled to first wallet 106a through cloud network 202.

After security sequence 120 (not shown) is completed, second wallet 106b may be disconnected from cloud network 202 and first wallet 106a in some embodiments. In various embodiments, after security sequence 120 is completed, first wallet 106a comprises at least one parity-token in plurality of parity-tokens 116 and second wallet 106b comprises at least another parity-token in plurality of parity-tokens 116. In the example shown, second wallet 106b includes parity-token 116b and first wallet 106a includes parity-token 116a. The simultaneous existence of parity-tokens 116a and 116b sharing a common ID in first wallet 106a and second wallet 106b respectively can prove that the user has access to and control over both wallets 106.

In various embodiments, even though second wallet 106b is communicatively disconnected from first wallet 106a (and/or blockchain network 110, and/or cloud network 202) after security sequence 120 is completed, second wallet 106b may be virtually linked to (e.g., associated with) first wallet 106a as long as plurality of parity-tokens 116 exist simultaneously at both first wallet 106a and second wallet 106b. In other words, second wallet 106b can be identified by identifying linked first wallet 106a irrespective of the physical (e.g., actual) presence (e.g., network connection, communicative coupling state) of second wallet 106b in blockchain network 110.

Figure 3:
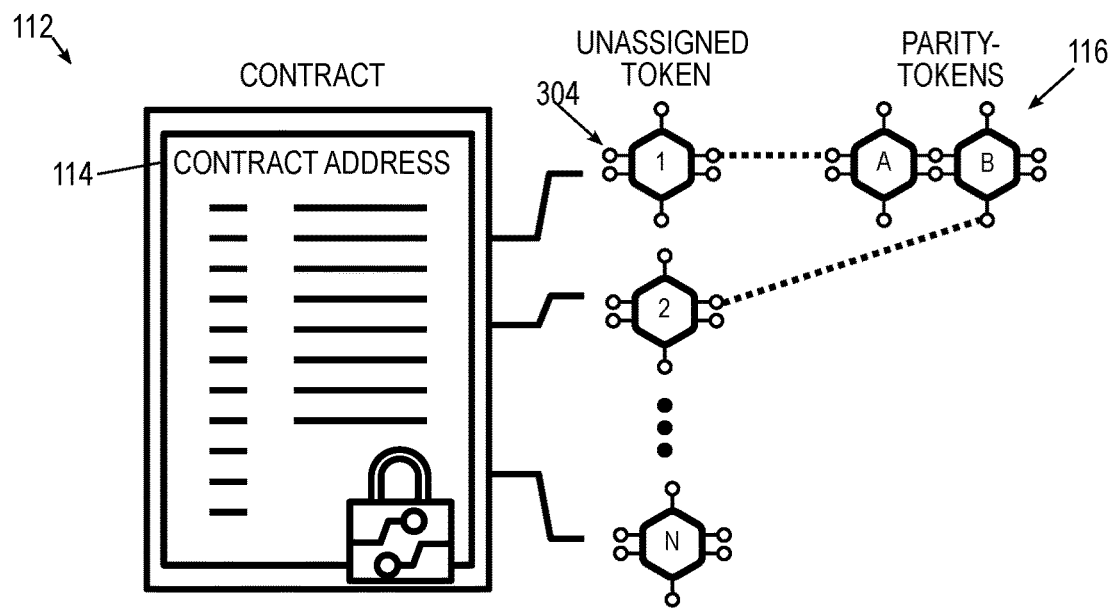
FIG. 3 is a simplified block diagram of an example contract in the system for linking blockchain wallets via entangled parity-tokens according to some embodiments of the present disclosure.

FIG. 3 is a schematic block diagram of contract 112 in system 100. In some embodiments, contract 112 may be created by server 104 prior to any communication with user-device 102. In other embodiments, contract 112 may be created by server 104 after a request for tokens is received from user-device 102. Contract 112 may be identified by contract address 114, which may be a unique identifier assigned to contract 112 at the time of creation of contract 112 in blockchain network 110.

In some embodiments, contract 112 provides for minting a fixed number N of unassigned tokens 304. In some embodiments, the number N may be specified at the time of creation of contract 112 and may be thereafter immutable according to blockchain protocols. In some embodiments, wherein contract 112 is created upon receiving a request for tokens, number N may be specified in the request. In other embodiments wherein contract 112 is created before receiving any request for tokens, number N may be an arbitrary number based on transaction cost, expected number of requests, and/or other considerations beyond the scope of the present disclosure.

In response to receiving a request to mint a specific number of tokens, server 104 may assign the requested number of unassigned tokens 304 to the wallet address specified in the request, thereby minting plurality of parity-tokens 116 in a single transaction. For example, unassigned tokens 304 labeled "1" and "2" in the figure may be minted together as plurality of parity-tokens 116 with labels "A" and "B". Tokens so minted in plurality of parity-tokens 116 share a common ID comprising, for example, contract address 114 and the transaction hash of the minting operation.

In various embodiments, contract 112 may be associated with a particular purpose, for example, a particular vendor (i.e., server 104 may associate different vendors with different contracts 112), a particular event (i.e., server 104 may associate different events such as sporting events, club events, etc. with different contracts 112), a particular NFT collection (i.e., server 104 may associate different NFT collections with different contracts 112), a particular type of transaction (i.e., server 104 may associate different types of transactions such as buying, selling, etc. with different contracts 112), a particular number of tokens (i.e., server 104 may associate different token numbers such as N=10, N=100, N=1000 with different contracts 112), etc. In other embodiments, contract 112 may be unassociated with any particular purpose and may be generated by server 104 based on general, business, or other considerations beyond the scope of the present disclosure.

Figure 4:
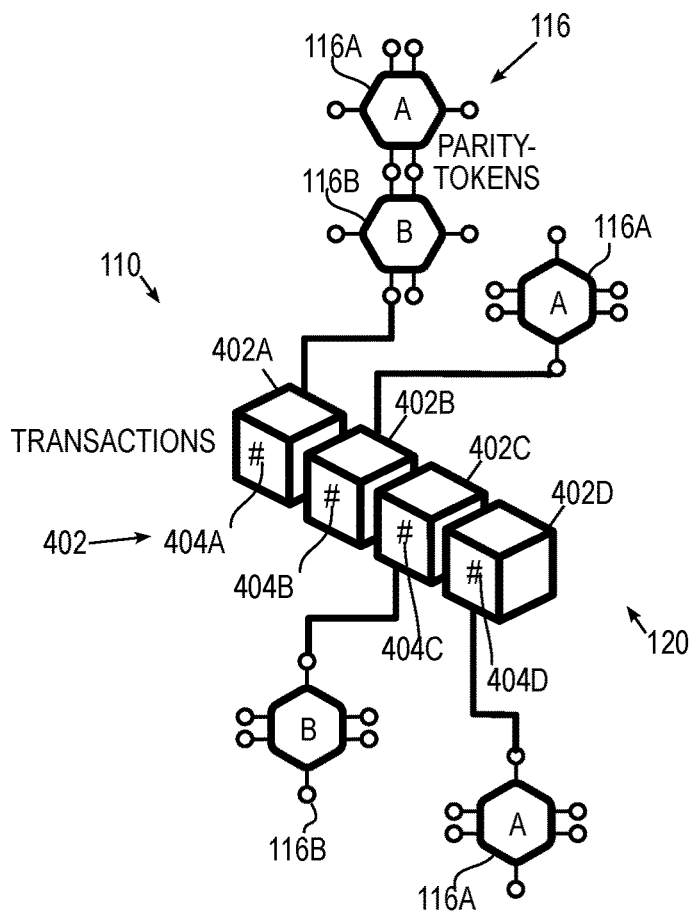
FIG. 4 is a simplified block diagram of example transactions in the system for linking blockchain wallets via entangled parity-tokens according to some embodiments of the present disclosure.

FIG. 4 is a schematic block diagram of transactions 402 associated with parity-tokens 116 in blockchain network 110. Transaction 402a may comprise minting of plurality of parity-tokens 116 to first wallet 106a. Transaction 402a may be assigned a unique transaction ID 404a by blockchain network 110 upon addition to the blockchain. In some embodiments, the transaction ID may be a hexadecimal hash. Transaction 402b may comprise transfer of one parity-token 116a in plurality of parity-tokens 116 from first wallet 106a to second wallet 106b. Transaction 402b may be assigned a unique transaction ID 404b by blockchain network 110 upon addition to the blockchain. Transaction 402c may comprise transfer of another parity-token 116b in plurality of parity-tokens 116 from first wallet 106a to second wallet 106b. Transaction 402c may be assigned a unique transaction ID 404b by blockchain network 110 upon addition to the blockchain. Transaction 402d may comprise transfer of parity-token 116a in plurality of parity-tokens 116 from second wallet 106b back to first wallet 106a. Transaction 402d may be assigned a unique transaction ID 404d by blockchain network 110 upon addition to the blockchain.

In some embodiments, transactions 402a, 402b, 402c and 402d in that chronological order (i.e., minting parity-tokens 116a and 116b, then transferring parity-token 116a from first wallet 106a to second wallet 106b, then transferring parity-token 116b from first wallet 106a to second wallet 106b, and finally transferring parity-token 116a back to first wallet 106a) comprise security sequence 120 for authenticating second wallet 106b and linking it with first wallet 106a. In some other embodiments, transactions 402a, 402c, 402b and 402d in that chronological order (i.e., minting parity-tokens 116a and 116b, then transferring parity-token 116b from first wallet 106a to second wallet 106b, then transferring parity-token 116a from first wallet 106a to second wallet 106b, and finally transferring parity-token 116a back to first wallet 106a) comprise security sequence 120 for authenticating second wallet 106b and linking it with first wallet 106a. In yet other embodiments, transactions 402a, 402b, 402d and 402c in that chronological order (i.e., minting parity-tokens 116a and 116b, then transferring parity-token 116a from first wallet 106a to second wallet 106b, then transferring parity-token 116a from second wallet 106b to first wallet 106a, and finally transferring parity-token 116b from first wallet 106a to second wallet 106b) comprise security sequence 120 for authenticating second wallet 106b and linking it with first wallet 106a. In other words, the exact sequence of transfer of parity-tokens 116a and 116b between first wallet 106a and second wallet 106b may be in any suitable order in security sequence 120 as long as parity-token 116a has been sent around from first wallet 106a and back thereto through second wallet 106b, and parity-token 116b is retained at second wallet 106b with number of transactions 402 not exceeding four in the case of two linked wallets 106, namely first wallet 106a and second wallet 106b. Note that the number of transactions 402 may be proportionally higher for a larger number of linked wallets 106.

In various embodiments, a query of transactions 402 in blockchain network 110 for the combination of contract address 114 and transaction ID 404a may be used to identify individual ones in plurality of parity-tokens 116 (e.g., 116a, 116b) minted in transaction 402a. A subsequent query of transactions 402 in blockchain network 110 for identified parity-tokens 116 may indicate no more than transactions 402a, 402b, 402c, and 402d, verifying that security sequence 120 is intact. Any intervening or additional transaction involving any one in plurality of parity-tokens 116 may invalidate security sequence 120.

In some embodiments, plurality of parity-tokens 116 may be transferred in a single transaction 402b from first wallet 106a to second wallet 106b. In such embodiments, security sequence 120 may have only three transactions 402, namely transaction 402a minting plurality of parity-tokens 116 at first wallet 106a, transaction 402b transferring plurality of parity-tokens 116 from first wallet 106a to second wallet 106b and transaction 402d transferring one of parity-tokens 116 (e.g., 116a) from second wallet 106b back to first wallet 106a. A subsequent query of transactions 402 in blockchain network 110 for the identified parity-tokens may indicate no more than transactions 402a, 402b, and 402d, verifying that security sequence 120 is intact. Any intervening or additional transaction involving any one in plurality of parity-tokens 116 may invalidate security sequence 120.

Figure 5:
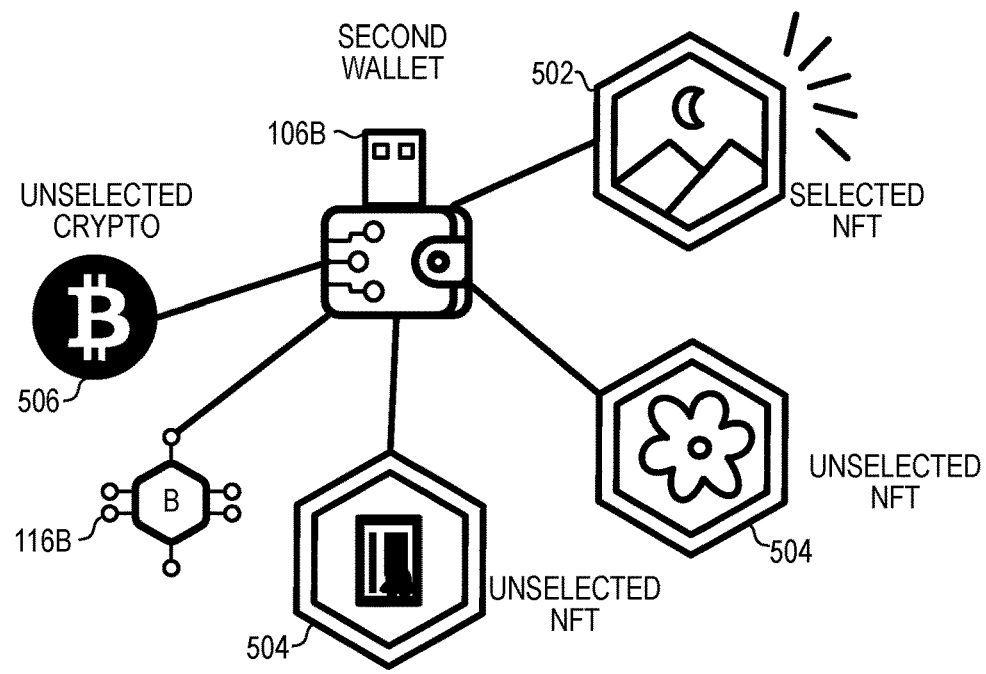
FIG. 5 is a simplified block diagram of an example wallet in the system for linking blockchain wallets via entangled parity-tokens according to some embodiments of the present disclosure.

FIG. 5 is a schematic block diagram of second wallet 106b holding a number of different types of digital assets, of which one (or more) may be selected for verification. In the example shown, in addition to selected NFT 502, there may be other unselected NFTs 504, cryptocurrency 506 and at least one of parity-tokens 116 (e.g., 116b) in second wallet 106b. Transactions 402 (not shown in the figure) of any of such tokens (e.g., selected NFT 502, unselected NFT 504, cryptocurrency 506 and parity-token 116b) can be queried in blockchain network 110 based on respective contract addresses 114 or other identifiers. In some embodiments, a query based on contract address 114 can be executed using a blockchain reader (e.g., Etherscan™) with the value of contract address 114 as the search term. Transactions 402 of tokens such as selected NFT 502, unselected NFT 504, cryptocurrency 506 and parity-token 116b will indicate that the last transaction is transfer to the wallet address of second wallet 106b.

In some embodiments, after second wallet 106b is linked with first wallet 106a (not shown in the figure), one or more NFTs 502 may be selected for verification. In some embodiments, selecting comprises converting unselected NFT 504 to selected NFT 502 by transmitting the contract address, token ID (or other identifier) of selected NFT 502 to server 104 for verification. In some other embodiments, in response to a request for verification, server 104 may query transactions 402 in blockchain network 110 for the wallet address of second wallet 106b. The wallet address may be obtained from looking up transactions 402 of parity-token 116a or 116b in first wallet 106a. The query based on wallet address 602 can indicate all transactions transferred to wallet address 602, including that of selected NFT 502 to be verified. As any transaction involving selected NFT 502 will necessarily reflect in the blockchain, that a last and final transaction associated with selected NFT 502 consists in moving it to second wallet address 602b of second wallet 106b confirms that the user who owns second wallet 106b also owns selected NFT 502.

Figure 6:
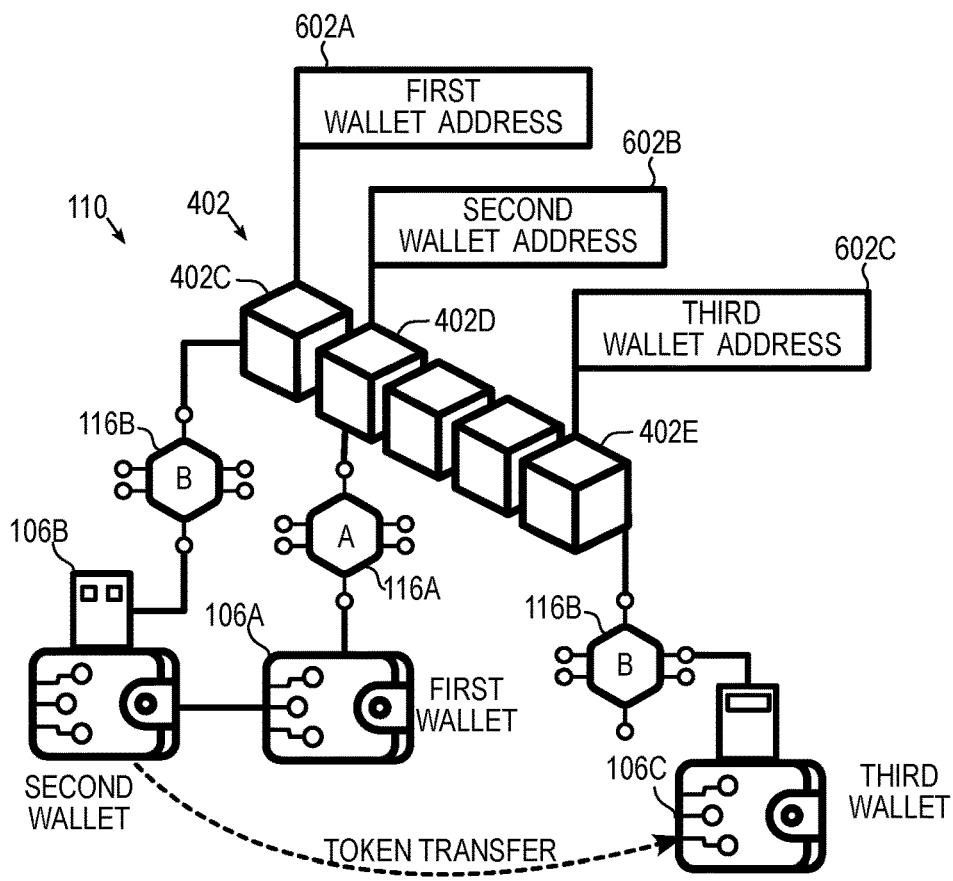
FIG. 6 is a simplified block diagram of example transactions associated with de-linking wallets in the system for linking blockchain wallets via entangled parity-tokens according to some embodiments of the present disclosure.

FIG. 6 is a schematic block diagram of an example transaction that breaks the link between first wallet 106a having a first wallet address 602a and second wallet 106b having a second wallet address 602b. In various embodiments, after security sequence 120 (not shown) has been completed, first wallet 106a is linked with second wallet 106b. A subsequent search for plurality of parity-tokens 116 in the blockchain indicates the simultaneous location of plurality of parity-tokens 116 at both first wallet address 602a and second wallet address 602b, authenticating the user's control over first wallet 106a and second wallet 106b. The subsequent search for plurality of parity-tokens 116 in the blockchain can bring up transaction 402c transferring parity-token 116b from first wallet 106a to second wallet 106b and transaction 402d transferring parity-token 116a from second wallet 106b to first wallet 106a. Information in transactions 402c and 402d comprise first wallet address 602a and second wallet address 602b.

Assume, merely for the sake of explanation and not as a limitation, that parity-token 116b in second wallet 106b is moved thereafter to a third wallet 106c. The transfer is reflected in transaction 402e in blockchain network 110 subsequent temporally to transactions 402c and/or 402d. Information in transaction 402e comprises a third wallet address 602c corresponding to third wallet 106c. A subsequent search for plurality of parity-tokens 116 in the blockchain can bring up additional transaction 402e, which invalidates security sequence 120, breaking the link between first wallet 106a and second wallet 106b.

Note that the above example is merely one of the ways by which the link between first wallet 106a and second wallet 106b can be broken. Other ways include not following security sequence 120, moving parity-token 116a from first wallet 106a after transaction 402d, etc.

Figure 7:
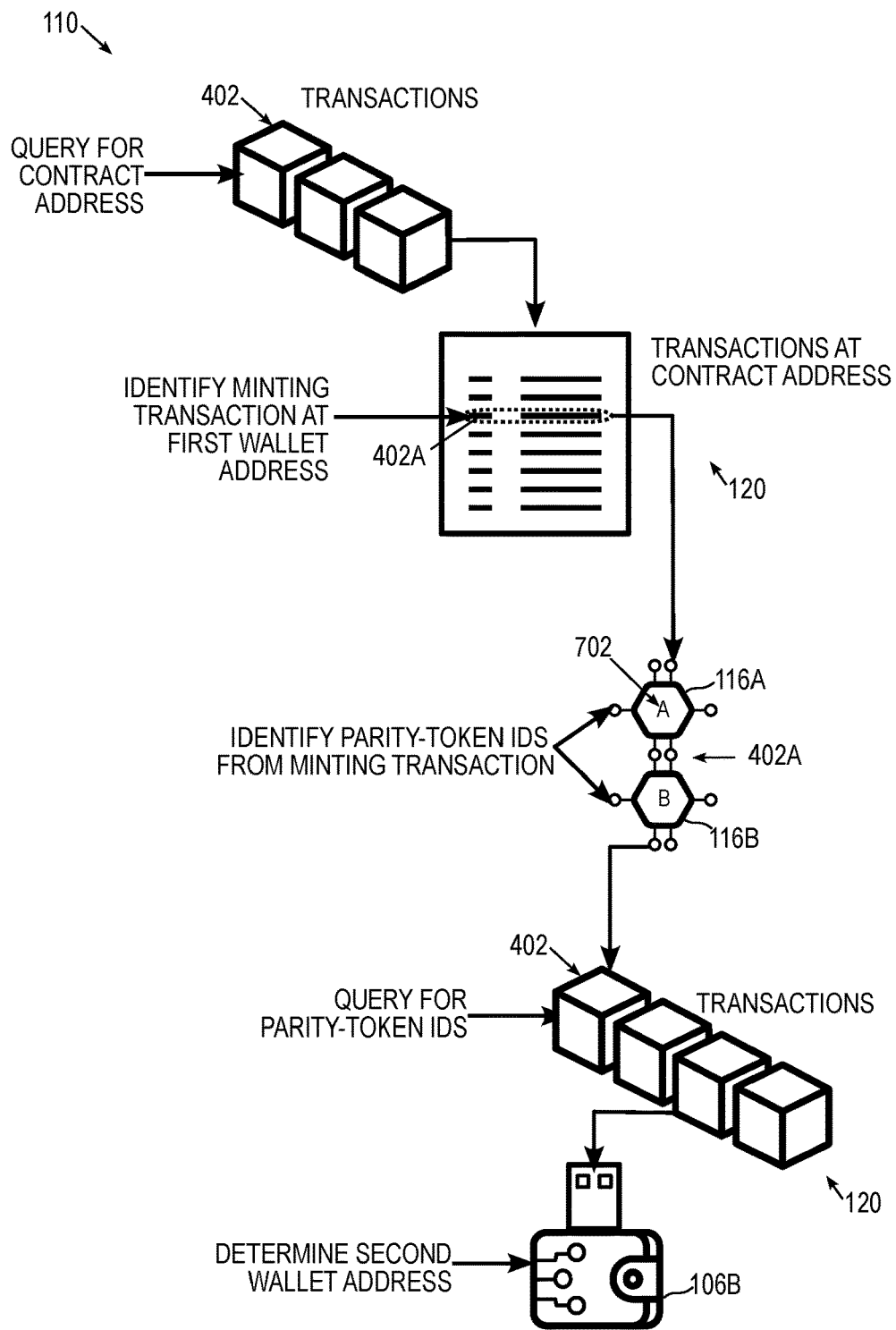
FIG. 7 is a simplified block diagram of example operations for authenticating a wallet address in the system for linking blockchain wallets via entangled parity-tokens according to some embodiments of the present disclosure.

FIG. 7 is a schematic block diagram of example queries to identify second wallet address 602b after from linked first wallet 106a and second wallet 106b. In various embodiments, the operations shown and described in FIG. 7 may be performed by server 104. Transactions 402 in blockchain network 110 may be queried by server 104 for authorized contract addresses 114 that are known to have minted plurality of parity-tokens 116. In some embodiments, when contract 112 having the functionality to mint parity-tokens is created in blockchain network 110, corresponding contract address 114 may be added to a list of authorized contract addresses maintained by server 104.

The resulting set of transactions associated with authorized contract addresses 114 may be searched using first wallet address 602a as the search term. As described previously, first wallet address 602a may be obtained by server 104 in various ways within the broad scope of the embodiments. For example, first wallet address 602a may be comprised in signed transaction 108 requesting plurality of parity-tokens 116 to be minted at first wallet 106a. In another example, first wallet address 602a may be comprised in signed transaction 108 requesting first wallet 106a to be authenticated. In another example, first wallet address 602a may be comprised in signed transaction 108 requesting second wallet 106b to be authenticated. In yet another example, first wallet address 602a may be comprised in signed transaction 108 requesting the presence of selected NFT 502 at first wallet 106a, second wallet 106b, or other linked wallets to be verified.

Transactions involving first wallet address 602a in the list of authorized contract addresses may be those forming security sequence 120 described in reference to previous figures. In particular, minting transaction 402a at first wallet address 602a may be identified in the set of transactions associated with the authorized contract addresses and first wallet address 602a. In some embodiments, wherein only one plurality of parity-tokens 116 is minted at first wallet address 602a, only one minting transaction 402a may be found in the set of transactions. In other embodiments wherein many pluralities of parity-tokens 116 are minted at first wallet address 602a, correspondingly many minting transactions 402a may be found in the set of transactions.

The combination of contract address 114 and transaction ID 404 can point to plurality of parity-tokens 116 minted simultaneously from contract address 114, minting transaction 402a being identified by respective transaction ID 404a. Information in minting transaction 402a can be used to identify the parity-token IDs 702 of individual ones in plurality of parity-tokens 116. In an example where plurality of parity-tokens 116 contains parity-tokens 116a and 116b, parity-token IDs 702 of parity-tokens 116a and 116b may be respectively, A and B. In another such example, parity-token IDs 702 of parity-tokens 116a and 116b may be respectively, 16 and 17. The particular values of parity-token IDs 702 may be based on the contract specifications of contract 112 used to mint plurality parity-tokens 116.

Subsequently, transactions 402 in blockchain network 110 may be queried based on the combination of identified parity-token IDs 702 and relevant contract address 114 from which they were minted. In some embodiments, parity-token IDs 702 alone may be sufficient to differentiate them from other tokens in blockchain network 10. Transactions 402 based on parity-token IDs 702 may be examined and a determination made that security sequence 120 has been followed. In an example embodiment where first wallet 106a is linked to second wallet 106b by parity-tokens 116a and 116b, a total of three transactions may be identified in the query using at least parity-token ID of parity-token 116a as the search term, namely 402a (e.g., minting at first wallet address 602a), 402b (e.g., transfer of parity-token 116a from first wallet 106a to second wallet 106b), and 402d (e.g., transfer of parity-token 116a from second wallet 106b to first wallet 106a). Two transactions may be associated with parity-token 116b, namely 402a, and 402c (e.g., transfer of parity-token 116b from first wallet 106a to second wallet 106b). After determining that security sequence 120 is valid (i.e., no additional or intervening transactions associated with parity-token IDs 702 in blockchain network 110), transactions 402b, 402c, and/or 402d may be parsed to identify second wallet address 602b.

Thus, based on only the first wallet address 602a receiving at server 104, second wallet address 602b can be determined based on the simultaneous presence of parity-token 116a in first wallet 106a and parity-token 116b in second wallet 106b. Note that although second wallet address 602b can be identified from transactions 402 of parity-token 116a alone, the authentication step may verify that twin parity-token 116b exists at second wallet 106b such that security sequence 120 has not been violated so that the link between first wallet 106a and second wallet 106b is intact. If the link is broken, then second wallet address 602b identified in transactions 402 of parity-token 116a need not be valid or owned by the common user. In other words, unless wallets 106 are linked together by security sequence 120 such that parity-tokens 116 exist simultaneously in all linked wallets 106, wallet address 602 (e.g., 602a) of any one wallet 106 (e.g., 106a) may not be used to determine wallet addresses 602 of other wallets 106 according to embodiments of the present disclosure.

Note that additional wallets linked to first wallet 106a through parity-tokens 116 minted in a single transaction 402a from a single contract 112 can be identified by querying for transactions 402 associated with parity-token IDs 702, and discovering wallet addresses 602 of such additional wallets 106. In other embodiments where additional wallets 106 are linked to first wallet 106a using different contracts 112 and/or different pluralities of parity-tokens 116, the operations as described herein can be executed any number of times with suitable search terms (e.g., contract address 114 and/or transaction IDs 404) to identify all wallets 106 linked with first wallet 106a using only first wallet address 602a.

Figure 8:
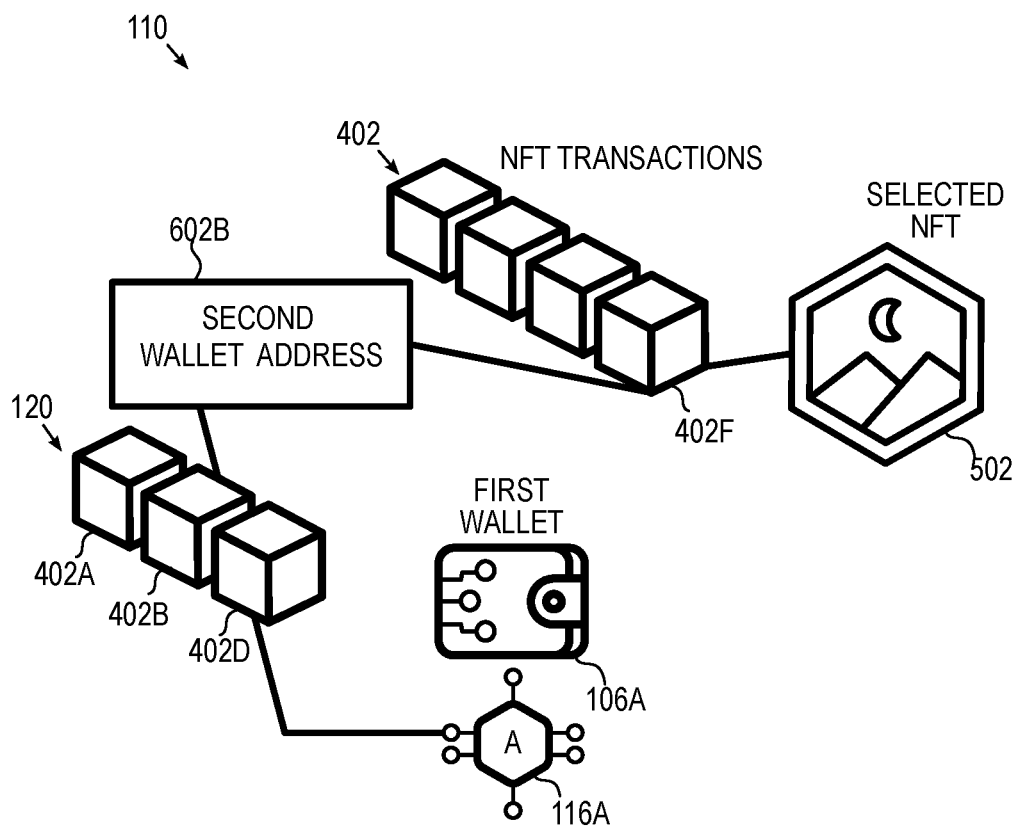
FIG. 8 is a simplified block diagram of example operations for verifying non-fungible tokens in the system for linking blockchain wallets via entangled parity-tokens according to some embodiments of the present disclosure.

FIG. 8 is a simplified block diagram illustrating certain operations that may be used to verify the presence of selected NFT 502 at second wallet address 602b. In some embodiments, for example, wherein parity-token 116a is at first wallet 106a, querying transactions 402 associated with parity-token 116a brings up transactions 402a, 402b, and 402d of security sequence 120. As described previously with reference to FIG. 4, transaction 402a is minting of parity-tokens 116a and 116b at first wallet 106a, transaction 402b is transfer of parity-token 116a from first wallet 106a to second wallet 106b, and transaction 402d is transfer of parity-token 116a from second wallet 106b to first wallet 106a. From a subset of these transactions, i.e., transactions 402b and 402d, second wallet address 602b may be identified. Second wallet 106b may also be confirmed to be linked to first wallet 106a by determining that security sequence 120 has not been violated (i.e., twin parity-token 116b exists at second wallet 106b) as described in reference to FIG. 7. After this confirmation, second wallet address 602b may be authenticated and linked with first wallet address 602a.

Queries based on selected NFT 502 may be executed in blockchain network 110 to find transactions 402 comprising transfer of selected NFT 502. A temporally last transaction 402f of selected NFT 502 may be the transfer of selected NFT 502 to second wallet 106b. Such transaction 402f may indicate second wallet address 602b as the last known address of selected NFT 502. These wallet addresses 602 identified from transactions 402b (or 402c) and 402f may be compared. If they match, selected NFT 502 can be confirmed to be at second wallet 106b. If they do not match, selected NFT 502 can be determined to be not at second wallet 106b.

Figure 9:
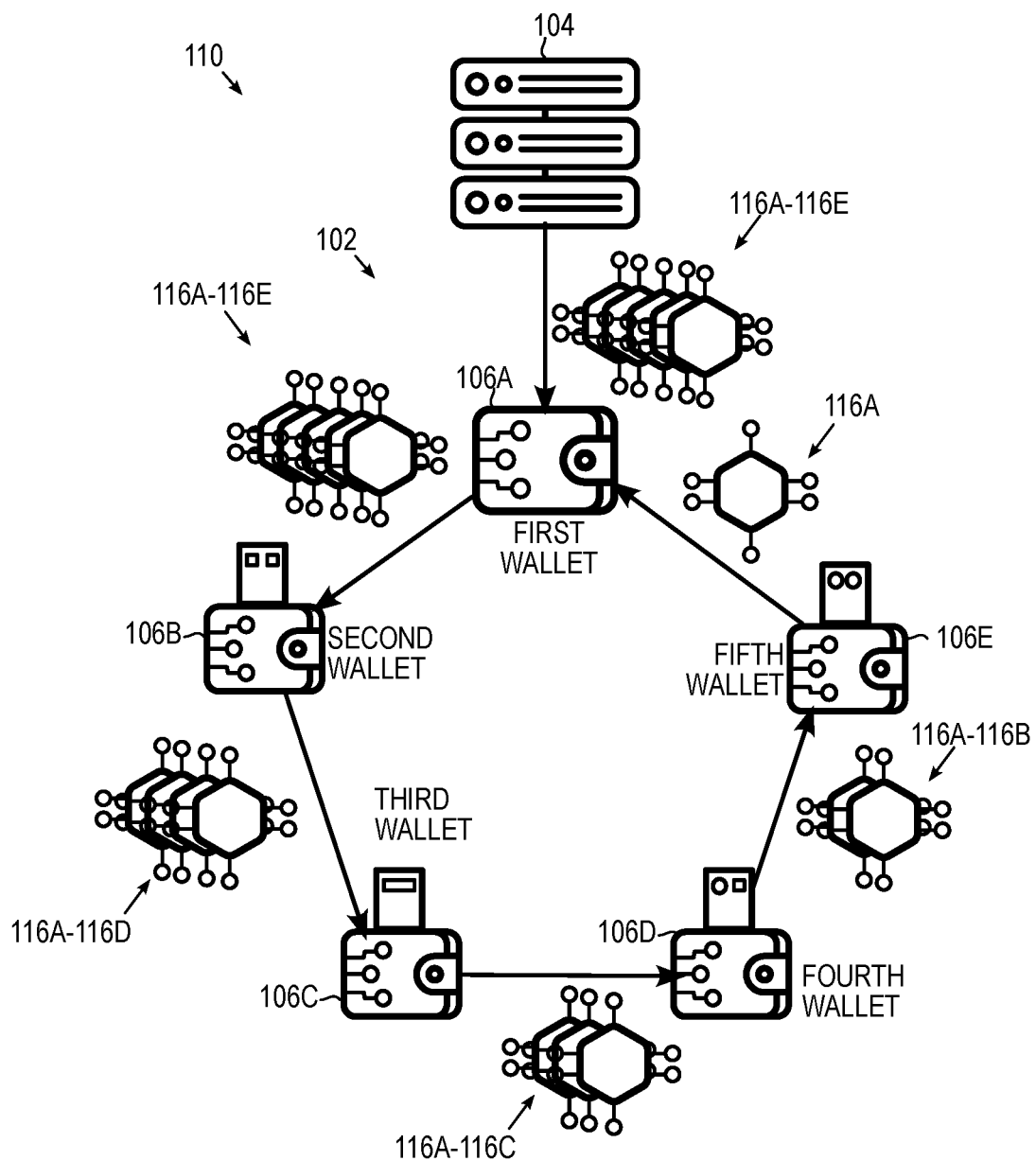
FIG. 9 is a simplified blocks diagram of example connections and operations associated with multiple wallets to be linked in the system for linking blockchain wallets via entangled parity-tokens according to some embodiments of the present disclosure.

FIG. 9 is a simplified block diagram illustrating certain operations associated with linking multiple wallets using a single plurality of parity-tokens 116 in blockchain network 110. To link N wallets together, N parity-tokens may be requested. Assume, merely as an example and not as a limitation, that five wallets 106a-106e are to be linked together in blockchain network 110. Server 104 may mint requested number of five parity-tokens, 116a-116e at first wallet 106a. All five parity-tokens 116a-116e may be transferred to second wallet 106b. Parity-token 116e may be retained at second wallet 106b, and parity-tokens 116a-116d may be transferred to third wallet 106c. Parity-token 116d may be retained at third wallet 106c, and parity-tokens 116a-116c may be transferred to fourth wallet 106d. Parity-token 116c may be retained at fourth wallet 106d, and parity-tokens 116a-116b may be transferred to fifth wallet 106e. Parity-token 116b may be retained at fifth wallet 106e, and the last remaining parity-token 116a may be transferred back to first wallet 106a, thereby completing security sequence 120 and linking all five wallets 106a-106e together. Thereafter, any authentication operations may verify that parity-tokens 116 are simultaneously at the wallet addresses of all five wallets 106a-106e. Any transfer of any one of parity-tokens 116a-116e out of any one of wallets 106a-106e may invalidate security sequence 120, causing the authentication to fail.

Figure 10:
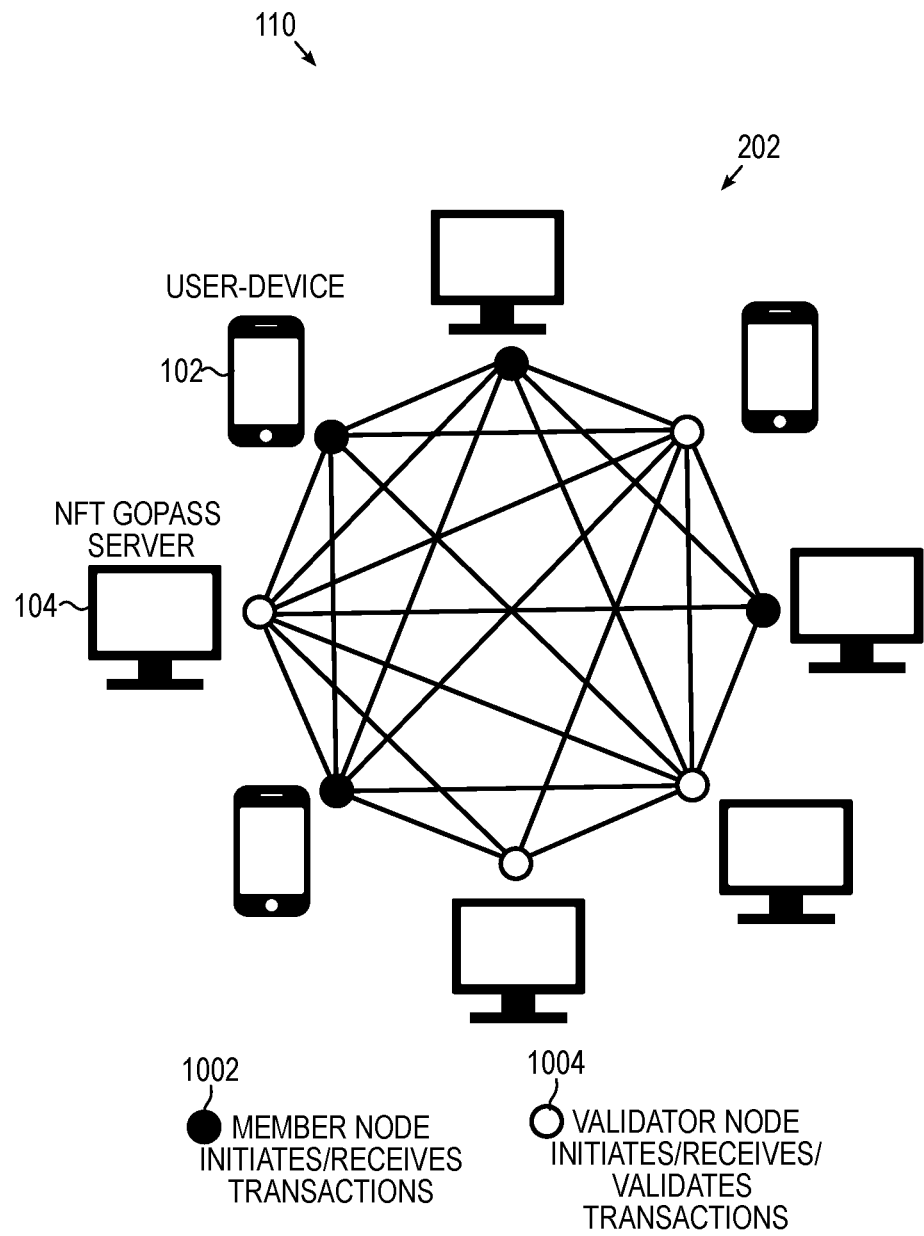
FIG. 10 is a simplified blocks diagram of an example blockchain network in the system for linking blockchain wallets via entangled parity-tokens according to some embodiments of the present disclosure.

FIG. 10 is a simplified block diagram of blockchain network 110 according to various embodiments. Blockchain network 110 comprises a network of member nodes 1002 and validator nodes 1004. Member nodes 1002 can only initiate and/or receive transactions 402. Validators nodes 1004 can initiate, receive, and/or validate transactions 402. Any transaction 402 in blockchain network 110 is sent to one or more validator nodes 1004, which confirms transaction 402 according to currently accepted methods (e.g., answering a mathematical question) and adds transaction 402 to the blockchain. In some embodiments, validator nodes 1004 run a distributed consensus protocol, execute transaction 402 as needed, and store transaction 402 and execution results on the blockchain. In some embodiments, validator nodes 1004 may decide which transactions will be added to the blockchain and in which order. Validator nodes 1004 may temporarily store in local memory buffers transactions that have been submitted to blockchain network 110 but not yet validated and added to the blockchain. Different brands and/or types of blockchain networks 110 may use different cryptographic means to validate and secure their respective blockchains. All such means and variations thereof are encompassed within the broad scope of the present disclosure.

Member nodes 1002 and validator nodes 1004 may communicate with each other through cloud network 202 as part of blockchain network 110. In some embodiments, user-device 102 may function as member node 1002 in blockchain network 110. In some other embodiments, user-device 102 may function as validator node 1004 in blockchain network 110. Likewise, in some embodiments, server 104 may function as member node 1002 in blockchain network 110. In some other embodiments, server 104 may function as validator node 1004 in blockchain network 110.

Figure 11A:
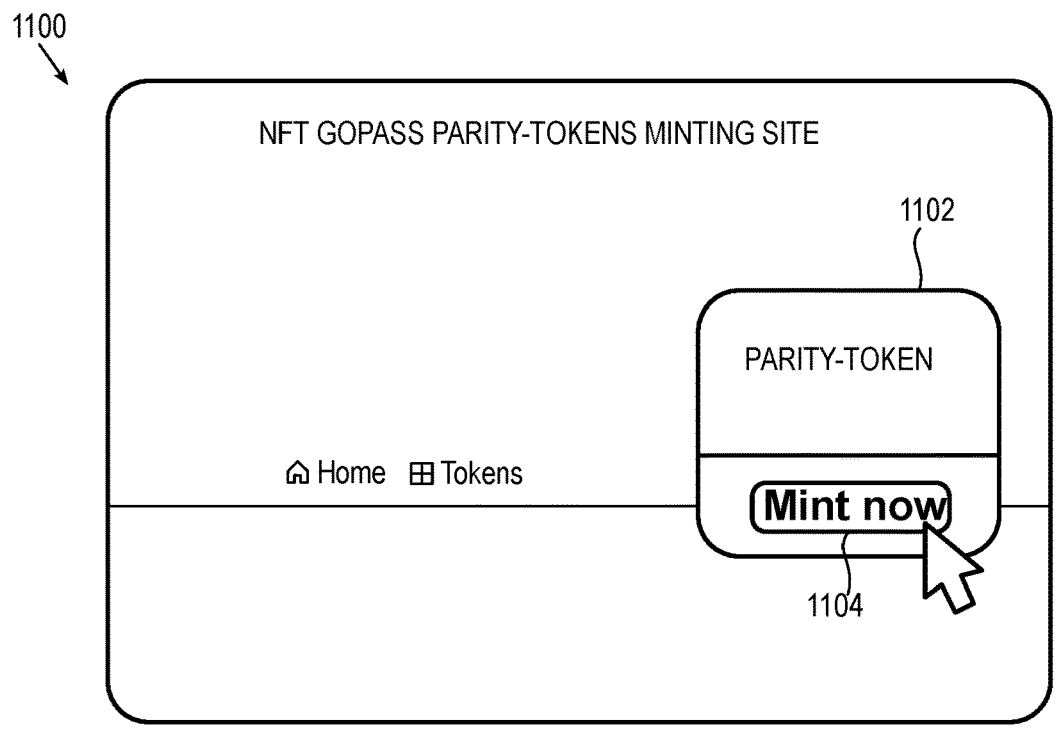
FIGS. 11A-11G are simplified diagrams showing example user-interfaces in the system for linking blockchain wallets via entangled parity-tokens according to some embodiments of the present disclosure.

FIGS. 11A-11G are simplified block diagrams of user-interfaces of various applications that may be used in system 100 according to various embodiments. FIG. 11A shows a user-interface 1100 for a token minting site. In various embodiments, the token minting site can be a publicly available Internet site in cloud network 202. A window 1102 on the site can present a button 1104 that can be selected (e.g., by the user). Selecting button 1104 may generate a request to mint plurality of parity-tokens 116 in blockchain network 110. In various embodiments, appropriate textual content may allow for ease of navigation and use by a user.

Figure 11B:
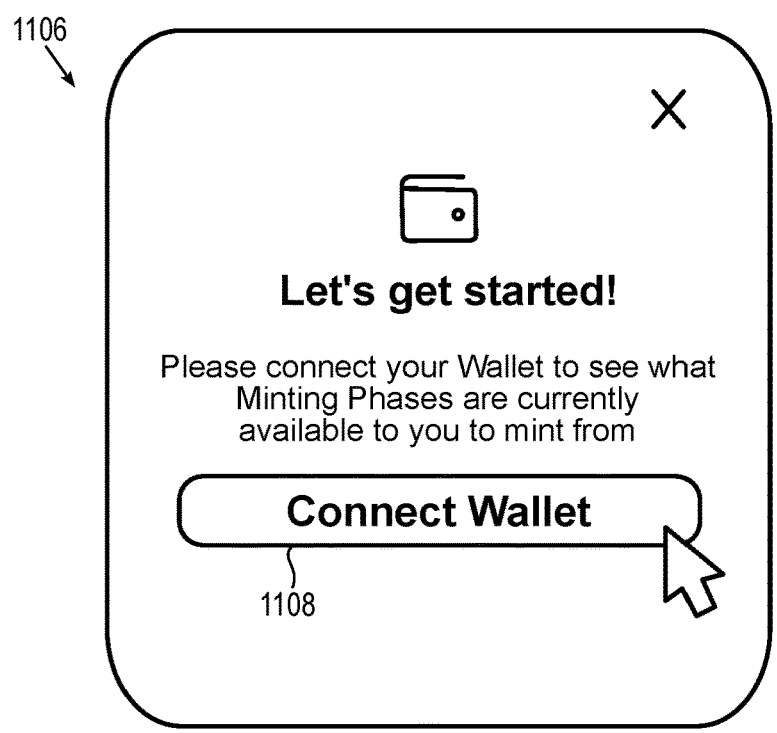

FIG. 11B shows a user-interface 1106 for communicatively coupling first wallet 106a to server 104. In the embodiment shown, first wallet 106a is a public wallet that can be communicatively coupled easily over cloud network 202 to server 104. In various embodiments, user-interface 1106 may include a selectable button 1108. Selecting button 1108 may send signed transaction 108 with first wallet address 602a of first wallet 106a to server 104 in some embodiments. In some other embodiments, selecting button 1108 may further open another window to select a particular one of the user's many wallets 106. Selecting the appropriate first wallet 106a may send signed transaction 108 to server 104 with first wallet address 602a of selected first wallet 106a. In some other embodiments, selecting button 1108 may open a communication channel between first wallet 106a and server 104, allowing server 104 to query and extract first wallet address 602a from first wallet 106a.

Figure 11C:
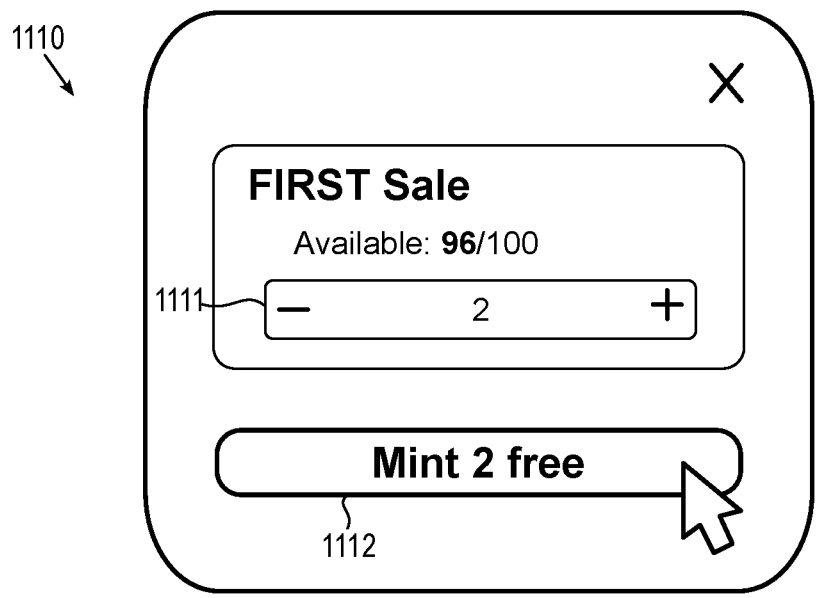

FIG. 11C shows a user-interface 1110 for minting plurality of parity-tokens 116. A window 1111 may allow the user to customize the number of parity-tokens, with a minimum number being 2. A user wishing to link more than two wallets together may choose the appropriate number of tokens accordingly. For example, five tokens may be chosen to link five wallets together. In the example shown, the user is given the option of increasing or decreasing the number of tokens using suitable "+" or "−" signs respectively. In some other examples, the user may manually enter the number of tokens into the appropriate box. Various other means for entering the number of tokens may be included within the broad scope of the embodiments. In some embodiments, the number (e.g., 96) of available tokens in contract 112 may be shown. In some embodiments, the total number (e.g., 100) of tokens in contract 112 may be shown. Selecting button 1112 may mint the requested number of parity-tokens in plurality of parity-tokens 116 from contract 112 to first wallet address 602a obtained through signed transaction 108 as described in FIG. 11B. For example, server 104 may change the data structure of parity-tokens 116a and 116b to point from unassigned address (e.g., null) to first wallet address 602a and broadcast the change to blockchain network 110. Validator nodes 1004 may validate the transaction and add it to the blockchain, completing minting transaction 402a.

In the example shown, selectable button 1112 may include a message indicating how many tokens may be freely minted. Although the message may suggest that the transaction is "free," gas fee for minting may nevertheless be paid to validator nodes 1004 in blockchain network 110 (e.g., by an entity other than the user who elects to mint the tokens). In the example shown, additional tokens may be minted at additional cost. Contract 112, which is used to mint plurality of parity-tokens 116, may specify the rules for pricing suitably. In other examples, any number of tokens may be minted at no charge. Various other such options may be presented to the user as desired based on particular needs.

Figure 11D:
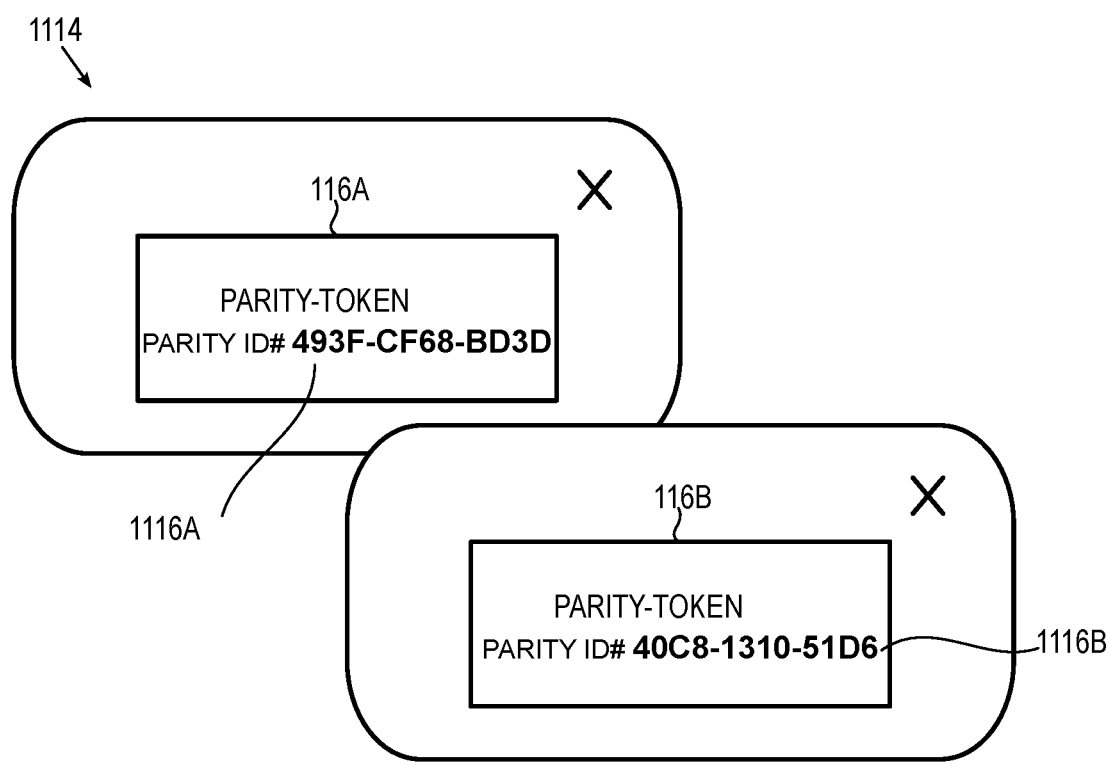

FIG. 11D shows two example parity-tokens 116a and 116b minted upon selecting button 1112 in previous FIG. 11C. Each of parity-tokens 116a and 116b may include pictures, labels (e.g., "parity-token"), names (e.g., "Parity ID #") and other digital features as desired based on particular needs. In one example, parity-tokens 116a and 116b may include an animated graphics interchange format (GIF) file that can add an aspect of interest to the user. It may be noted that each of parity-tokens 116a and 116b may be an NFT (i.e., not a fungible token such as cryptocurrency). In some embodiments, the visual appearance of parity-tokens 116a and 116b may be identical. In other embodiments, the visual appearance of parity-tokens 116a and 116b may be different. Whatever may be the visual appearance of parity-tokens 116a and 116b, they share a common ID that serves to link them together. In some embodiments, as described previously, the common ID may be the combination of contract address 114 and transaction ID 404 of the simultaneous minting transaction from a common contract to appropriate wallet 106.

Figure 11E:
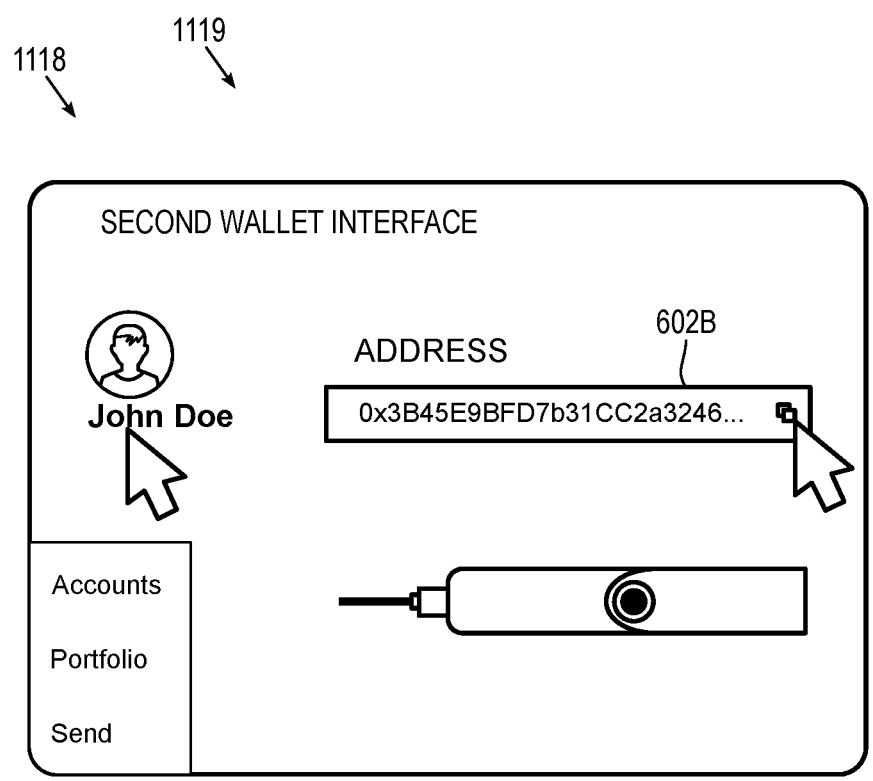

FIG. 11E shows a user-interface 1118 of a wallet application 1119 of second wallet 106b allowing a user to view and/or copy second wallet address 602b. In some embodiments, second wallet address 602b may be displayed in user-interface 1118 in a text box so that second wallet address 602b can be selected and/or copied. In other embodiments, second wallet address 602b may be displayed elsewhere in user-interface 1118 (e.g., not in a text box). In some embodiments, selecting second wallet address 602b may copy it to a clipboard of user-device 102. In some embodiments, the same operations may be performed at first wallet 106a to obtain first wallet address 602a of first wallet 106a.

Figure 11F:
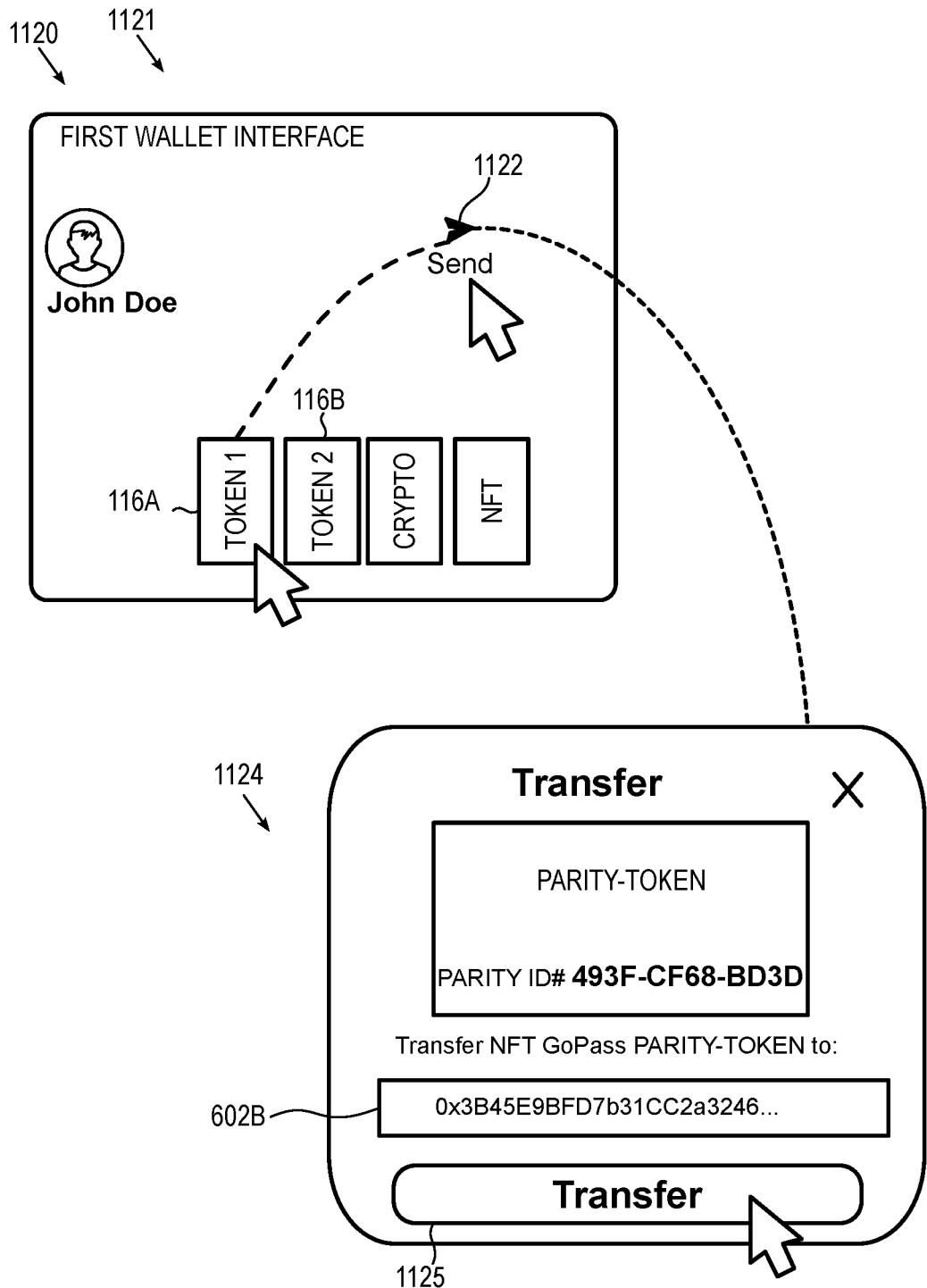

FIG. 11F shows a user-interface 1120 of a wallet application 1121 of first wallet 106a. In the example, two individual ones in plurality of parity-tokens 116 (e.g., 116a and 116b) are displayed in user-interface 1120 along with other digital assets, such as cryptocurrency and NFTs. User-interface 1120 may allow the user to select the displayed digital assets and transfer them, for example, using a selectable button 1122. In the example shown, selectable button 1122 is labeled "send". Any suitable labels or formats may be used to perform the transfer operation. For example, the user may select parity-token 116a (e.g., by clicking on it) and then select button 1122. In another example, the user may select button 1122, which may open a further window allowing the user to select one of the digital assets in first wallet 106a.

In a further window 1124, the digital asset, for example, parity-token 116a, to be transferred may be displayed. The user may be prompted to input the address to which the digital assets are to be transferred. The user may input second wallet address 602b of second wallet 106b. In one example, second wallet address 602b may be obtained as described in reference to FIG. 11E. Window 1124 may include a selectable button 1125. Selecting button 1125 may initiate a transaction transferring the selected parity-token 116a to second wallet address 602b. Wallet application 1121 may change the data structure of parity-token 116a to point to second wallet address 602b and broadcast the change to blockchain network 110. Validator nodes 1004 may validate the transaction and add it to the blockchain. The operations as described may be repeated to transfer parity-token 116a from first wallet 106a to second wallet 106b.

Figure 11G:
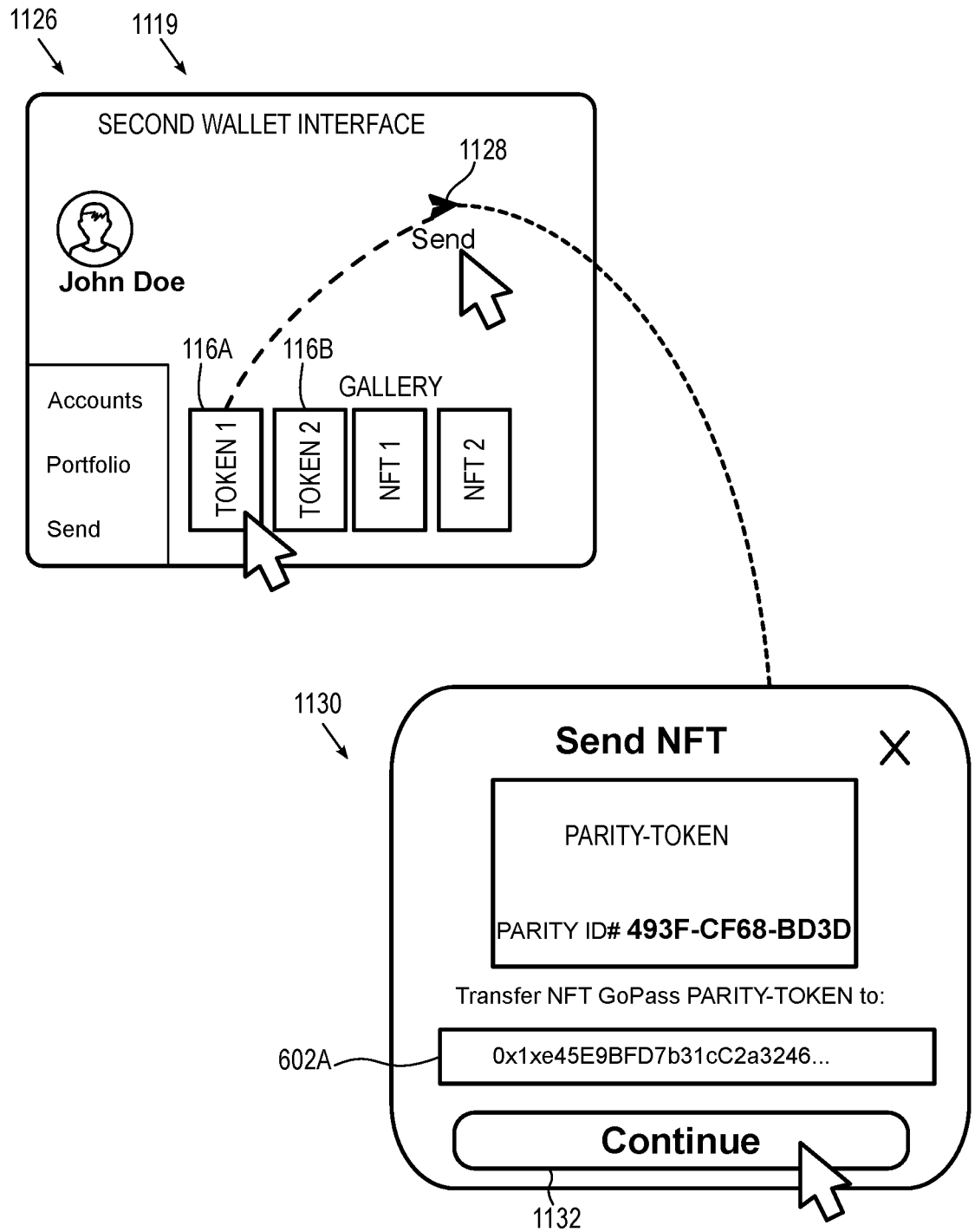

FIG. 11G shows a user-interface 1126 of wallet application 1119 of second wallet 106b. In some embodiments, user-interface 1126 may execute in user-device 102. In some other embodiments, user-interface 1126 may execute in a hardware device that comprises second wallet 106b. In yet other embodiments, user-interface 1126 may execute in user-device 102 whereas backend functionalities resulting from user selections on user-interface 1126 may execute in the hardware device. In the example, two individual ones in plurality of parity-tokens 116 (e.g., 116a and 116b) transferred as described in the operations referenced in FIG. 11F are displayed along with other digital assets, such as NFTs. As described in reference to FIG. 11F, user-interface 1126 may allow the user to transfer digital assets suitably using a selectable button 1128. For example, the user may select parity-token 116a (e.g., by clicking on it) and subsequently select button 1128. In another example, the user may select button 1128, which may open a further window allowing the user to select one of the digital assets in second wallet 106b.

In a further window 1130, the digital asset, for example, parity-token 116a, to be transferred may be displayed. The user may be prompted to input the address to which the digital assets are to be transferred. The user may input first wallet address 602a of first wallet 106a. In one example, first wallet address 602a may be obtained by the user as described in reference to FIG. 11E. Window 1130 may include a selectable button 1132. Selecting button 1132 may initiate a transaction transferring the selected parity-token 116a to first wallet address 602a. Wallet application 1119 may change the data structure of parity-token 116a to point to first wallet address 602a and broadcast the change to blockchain network 110. Validator nodes 1004 may validate the transaction and add it to the blockchain.

Note that the user-interfaces shown and described in FIGS. 11A-11G are merely for example purposes and are not to be construed as limitations. Any suitable user-interface design may be employed within the broad scope of the embodiments to perform security sequence 120, namely, minting plurality of parity-tokens 116, transferring them from first wallet 106a to second wallet 106b and transferring at least one of them (e.g., 116a) back from second wallet 106b to first wallet 106a. Further, although user-interfaces 1120 and 1126 of first wallet 106a and second wallet 106b respectively are shown as being similar, such is only for example purposes and for ease of illustration. Wallet user-interfaces may vary depending on the brand and type of wallet application and type of wallet. For example, a software public wallet such as MetaMask™ may have one user-interface and a hardware cold storage wallet such as Ledger Nano™ may have another user-interface. Further wallet applications 1119 and 1121 may be the same or different depending on the type of wallet application, and other considerations beyond the scope of the present disclosure. In some embodiments, wallet applications 1119 and/or 1121 may execute entirely on user-device 102, or other computing device or hardware device as appropriate). In other embodiments, wallet applications 1119 and/or 1121 may execute partially on user-device 102, or other computing device or hardware device as appropriate, and partially on a server in cloud network 202.

Figure 12A:
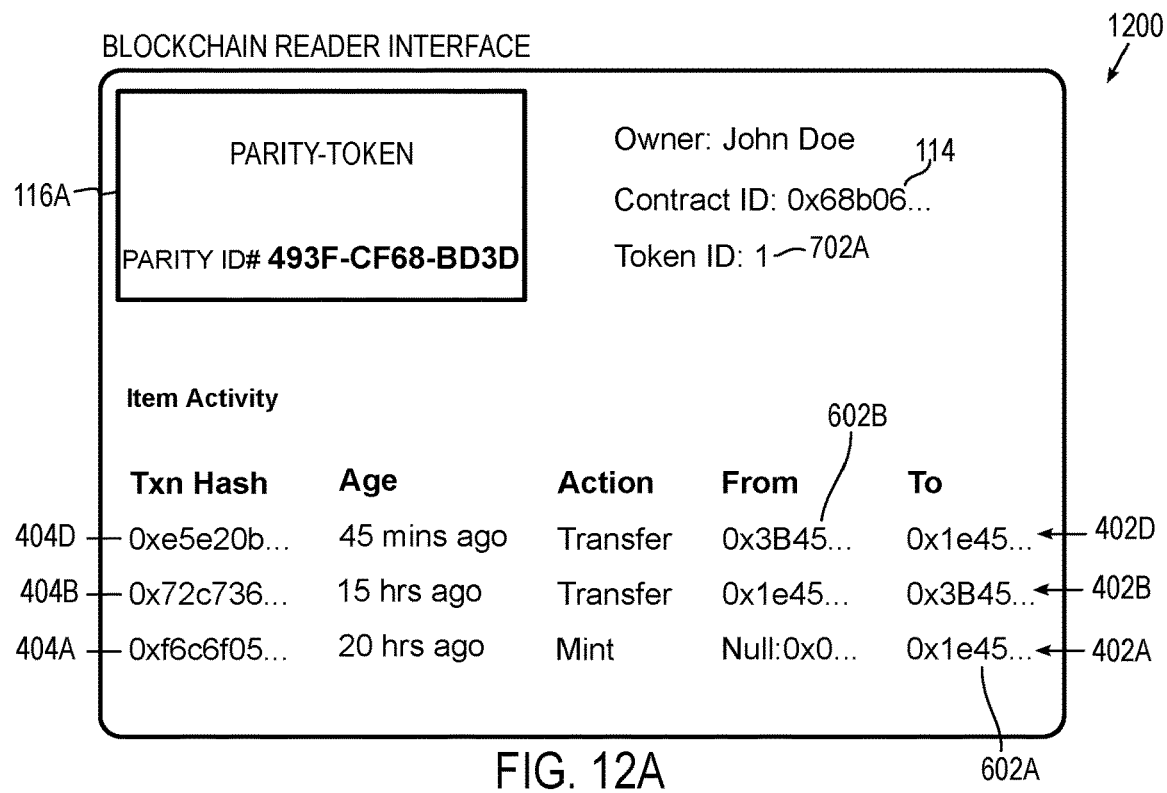
FIGS. 12A-12D are simplified diagrams showing example user-interfaces in the system for linking blockchain wallets via entangled parity-tokens according to some embodiments of the present disclosure.

FIG. 12A shows an example blockchain reader interface 1200 for example parity-token 116a. Note that blockchain reader interface 1200 is merely an example, for the sake of explaining blockchain queries and results thereof and is not to be construed as a limitation. In some embodiments, example blockchain reader interface 1200 is relevant only for manual searches, by which a user may manually query blockchain network 110 using a suitable blockchain reader, such as Etherscan™. In embodiments where server 104 queries blockchain network 110 for transactions 402, such blockchain reader interface 1200 may be irrelevant. The reader interfaces and results of queries are being shown here merely as aids to explanation and not as limitations. Although a suitable reader such as Etherscan™ may be used by server 104 to read transactions 402 in some embodiments, such queries may be performed automatically without human intervention by scripts executing in server 104, without employing any reader interface such as example blockchain reader interface 1200.

Example blockchain reader interface 1200 displays information about parity-token 116a, for example, in response to a user query based on contract address 114 and parity-token ID 702a as search terms. Blockchain reader interface 1200 may display information about the owner, contract address 114, and parity-token ID 702a. The query may display transactions 402a, 402b, and 402d associated with parity-token 116a, and as described in reference to FIG. 4. Transactions 402a, 402b and 402d may be identified by respective transaction IDs 404a, 404b and 404d. The query may indicate when the transactions transpired, what type of transaction was performed (e.g., minting, or transfer), and indicate the wallet address 602 from which the transaction originated and to which parity-token 116a was transferred.

For example, transaction 402a, identified by transaction ID 404a is indicated as a minting transaction to first wallet address 602a. Transaction 402b, identified by transaction ID 404b is indicated as a transfer of parity-token 116a from first wallet address 602a to second wallet address 602b. Transaction 402d, identified by transaction ID 404d is indicated as a transfer from second wallet address 602b to first wallet address 602a.

Figure 12B:
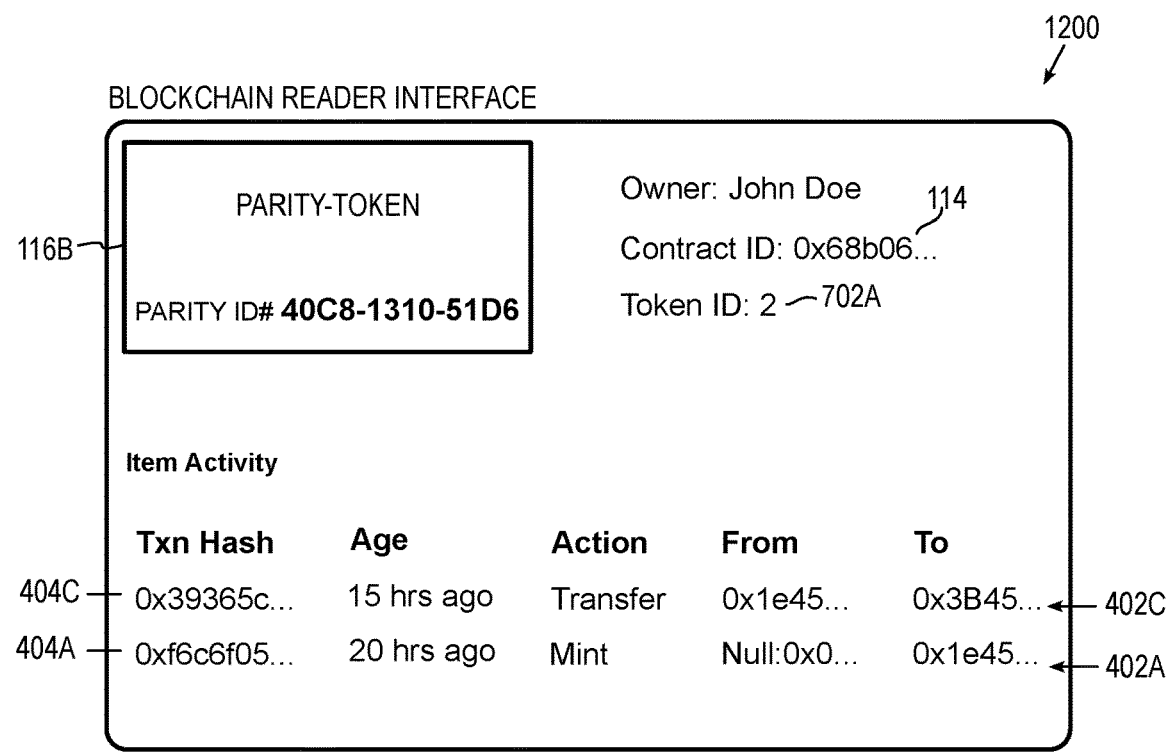

FIG. 12B shows example blockchain reader interface 1200 displaying information about parity-token 116b. Blockchain reader interface 1200 may display the example information shown in response to a user query based on contract address 114 and parity-token ID 702b as search terms. Contract address 114 of parity-token 116b is shared with that of parity-token 116a, so that both values are identical. The query may display transactions 402a, and 402c associated with parity-token 116b, and as described in reference to FIG. 4. Transactions 402a and 402c may be identified by respective transaction IDs 404a and 404c. The query may indicate when the transactions transpired, what type of transaction was performed (e.g., minting, or transfer), and indicate the wallet address 602 from which the transaction originated and to which parity-token 116a was transferred.

For example, transaction 402a, identified by transaction ID 404a is indicated as a minting transaction to first wallet address 602a. Note that transaction ID 404a is identical in the transaction lists of parity-tokens 116a and 116b, as they are both minted in same transaction 402a. Transaction 402c, identified by transaction ID 404c is indicated as a transfer of parity-token 116b from first wallet address 602a to second wallet address 602b. There are no further transactions as parity-token 116b is retained at second wallet 106b.

Thus, the combination of transactions 402 from a query of parity-tokens 116a and 116b may extract all transactions 402 of security sequence 120. If, in response to the query, additional transactions 402 are found, or not all transactions 402 are found, security sequence 120 may be invalidated, thereby breaking any link between first wallet 106a and second wallet 106b.

Figure 12C:
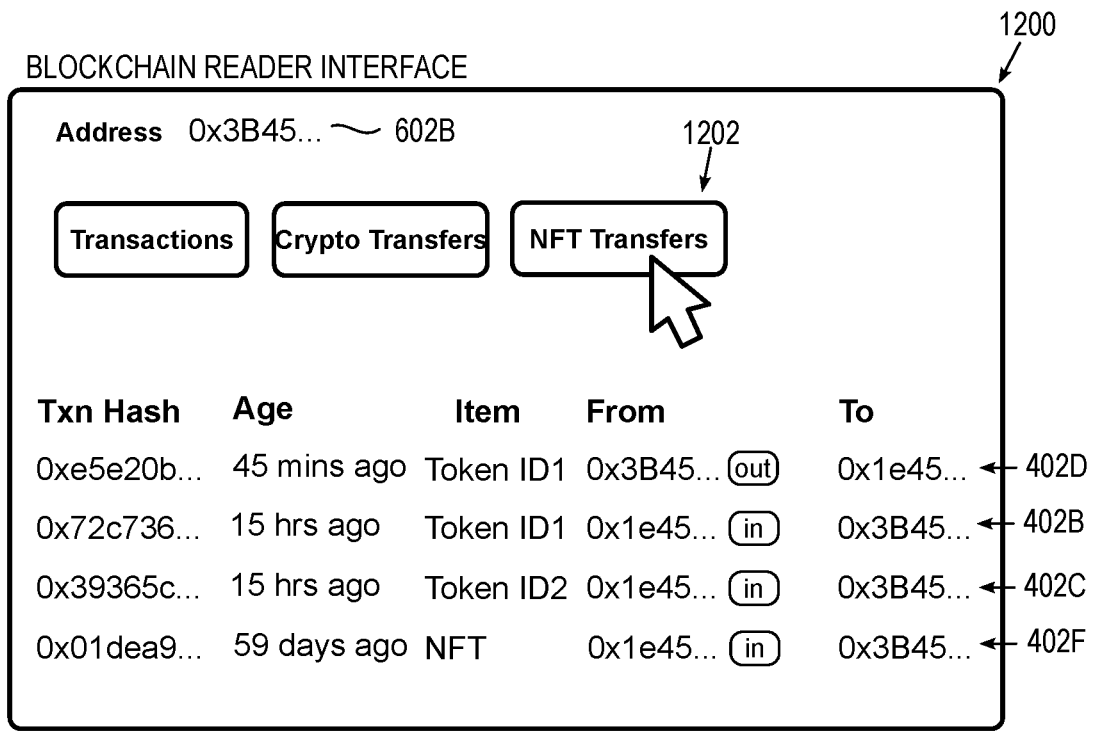

FIG. 12C shows example blockchain reader interface 1200 displaying information about transactions 402 associated with an address, in this case, the second wallet address 602b. In example blockchain reader interface 1200, selectable buttons 1202 may permit the user to select subsets of information from the search query. For example, one of selectable buttons 1202 may display transactions 402 associated with all NFTs at second wallet address 602b. Transaction 402f may comprise transfer of selected NFT 52 to second wallet 106b. Transaction 402c may comprise transfer of parity-token 116b from first wallet 106a to second wallet 106b. Transaction 402b may comprise transfer of parity-token 116a from first wallet 106a to second wallet 106b. Transaction 402d may comprise transfer of parity-token 116a from second wallet 106b to first wallet 106a. Transactions 402d and 402c may confirm respectively that parity-token 116a is transferred out of second wallet 106b to first wallet 106a and parity-token 116b is retained in second wallet 106b, confirming the link between first wallet 106a and second wallet 106b.

Figure 12D:
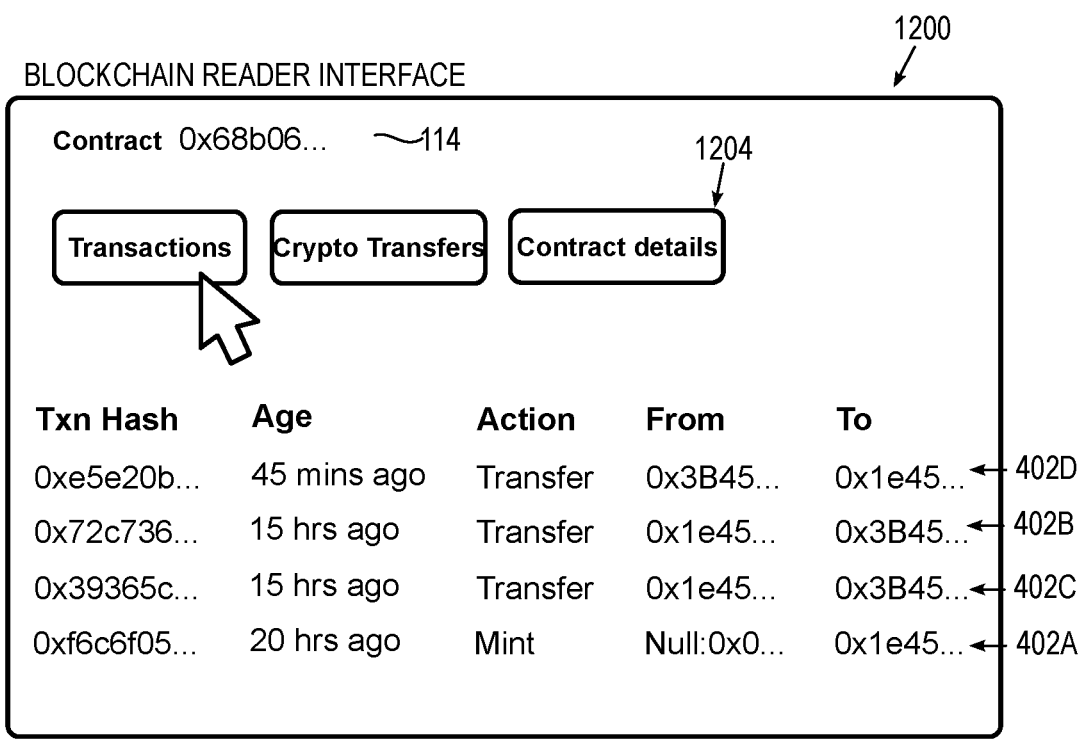

FIG. 12D shows example blockchain reader interface 1200 displaying information about transactions 402 associated with contract 112 identified by contract address 114 for minting plurality of parity-tokens 116. In example blockchain reader interface 1200, selectable buttons 1204 may permit the user to select subsets of information from the search query. For example, one of selectable buttons 1204 may display transactions 402 involving contract address 114. Transaction 402a may comprise minting of plurality of parity-tokens 116 (e.g., 116a and 116b) to first wallet 106a. Transaction 402c may comprise transfer of parity-token 116b from first wallet 106a to second wallet 106b. Transaction 402b may comprise transfer of parity-token 116a from first wallet 106a to second wallet 106b. Transaction 402d may comprise transfer of parity-token 116a from second wallet 106b to first wallet 106a. The four transactions 402a-402d may confirm that security sequence 120 was followed, verifying the link between first wallet 106a and second wallet 106b.

In various embodiments, any of the features discussed with reference to any of FIGS. 1-12 herein may be combined with any other features to form system 100 for authenticating and/or linking multiple wallets 106 in blockchain network 110 as described herein. For example, system 100 as shown in FIG. 1 may be combined with multiple wallets 106 as shown in FIG. 9 in some embodiments. In other embodiments, system 100 as shown in FIG. 1 may be integrated into blockchain network 110 as shown in FIG. 10. Some such combinations are described above, but, in various embodiments, further combinations and modifications are possible. Various different embodiments described in different figures may be combined suitably based on particular needs within the broad scope of the embodiments.

Example Methods

Figure 13:
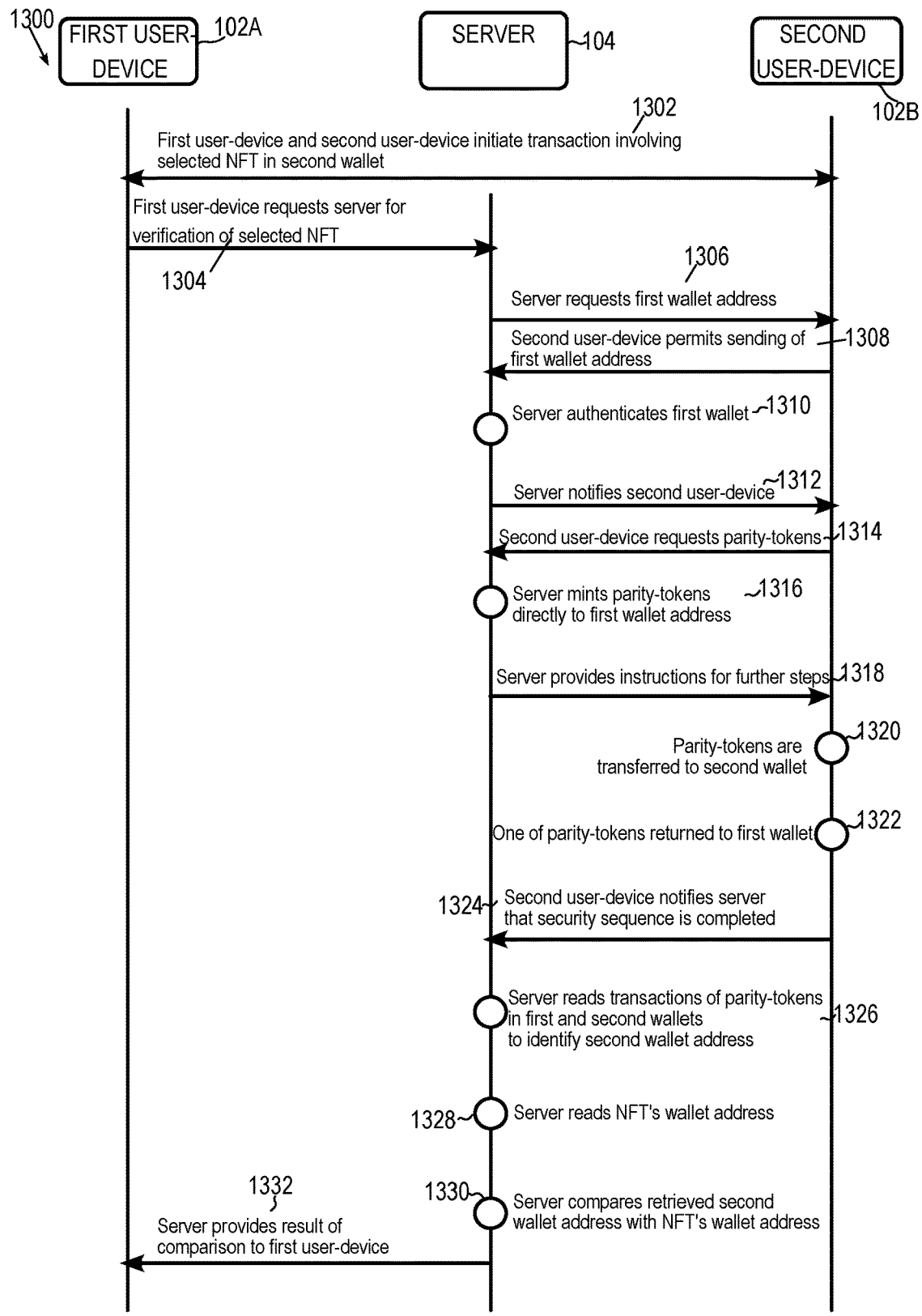
FIG. 13 is a simplified sequence diagram showing a sequence of operations for linking blockchain wallets via entangled parity-tokens and verifying non-fungible tokens according to some embodiments of the present disclosure.

FIG. 13 is a sequence diagram showing an example sequence 1300 that may be associated with embodiments of the present disclosure. At 1302, a first user-device 102a may communicate with a second user-device 102b, for example, initiating a transaction involving selected NFT 502 in second wallet 106b. In example embodiments, the transaction may involve a business dealing, such as verifying selected NFT 502 as a digital ticket, loan security, etc. Any suitable purpose may be attributed to the transaction between first user-device 102a and second user-device 102b within the broad scope of the embodiments. At 1304, first user-device 102a may request server 104 to verify selected NFT 502. In the request, sufficient information may be provided to enable server 104 to communicate with second user-device 102b. At 1306, server 104 may request first wallet address 602a from second user-device 102b. In various embodiments, the request may be received at a wallet application 1121 (or portion thereof) executing in second user-device 102b. At 1308, second user-device 102b may permit sending of first wallet address 602a. Upon receiving the permission, the wallet application 1121 may send first wallet address 602a to server 104.

At 1310, server 104 may authenticate first wallet 106a. In some embodiments, authenticating first wallet 106a includes confirming that first wallet address 602a exists validly in blockchain network 110. In some other embodiments, authenticating first wallet 106a includes receiving signed transaction 108 from wallet application 1121 executing in second user-device 102b with first wallet address 602a. At 1312, server 104 may notify second user-device 102b of completion of authentication. At 1314, second user-device 102b may request plurality of parity-tokens 116 from server 104. At 1316, server 104 may mint plurality of parity-tokens 116 directly to first wallet address 602a. In various embodiments, the operation may comprise generating minting transaction 402a by adding an owner ID (e.g., first wallet address 602a) of the data structure of plurality of parity-tokens 116, and broadcasting the minting transaction to blockchain network 110, after which validator nodes 1004 may add the transaction to the blockchain. At 1318, server 104 may provide instructions for further steps to wallet application 1121 and/or user-device 102 for completing security sequence 120.

At 1320, plurality of parity-tokens 116 may be transferred by wallet application 1121 in second user-device 102*b* from first wallet 106*a* to second wallet 106*b*. In some embodiments, the operation may comprise generating the transactions transferring plurality of parity-tokens 116 by changing the owner ID of the data structure of individual parity-tokens in plurality of parity-tokens 116, and broadcasting such transactions to blockchain network 110, after which validator nodes 1004 may add the transactions to the blockchain. In some embodiments, plurality of parity-tokens 116 may be transferred in multiple sequential transactions 402 to second wallet 106*b*). In some other embodiments, plurality of parity-tokens 116 may be transferred in a single transaction 402 to second wallet 106*b*. In such embodiments, the transaction for all individual ones in the plurality of parity-tokens 116 may have identical transaction IDs 404.

At 1322, an individual one (e.g., 116*a*) in plurality of parity-tokens 116 may be returned to first wallet 106*a*. In some embodiments, the operation may comprise generating, by wallet application 1119, the transaction by changing the owner ID of the data structure of the individual one plurality of parity-tokens 116, and broadcasting the transaction to blockchain network 110, after which validator nodes 1004 may add the transaction to the blockchain. Note that in some embodiments, wherein multiple wallets 106 may be linked together, transfers of plurality of parity-tokens 116 may be executed between operations 1320 and 1322 as described in reference to FIG. 9. At 1324, second user-device 102*b*, for example, by way of the wallet application 1121 executing therein, may notify server 104 that security sequence 120 is completed.

At 1326, server 104 may read transactions 402 in blockchain network 110 of plurality of parity-tokens 116. In some embodiments, server 104 reading transactions 402 may not be the same physical device as the one that performed the minting operation discussed previously. In some other embodiments, server 104 reading transaction 402 may be the same physical device as the one that performed the minting operation discussed previously. After confirming that security sequence 120 is intact (i.e., no more or less number of transactions 402 than expected), server 104 may identify second wallet address 602*b* in one or more transactions 402 thus examined. At 1328, server 104 may read transactions 402 associated with selected NFT 502 to determine another wallet address thereof based on the last transaction 402*f* associated therewith. At 1330 server 104 may compare retrieved second wallet address 602*b* from operation 1326 with the wallet address of selected NFT 502 from operation 1328. If the two wallet addresses match, selected NFT 502 may be verified to be at second wallet 106*b*. If the two wallet addresses do not match, selected NFT 502 may be verified to be not at second wallet 106*b*. At 1332, the results of the comparison from operation 1330 may be communicated to first user-device 102*a* by server 104.

Figure 14:
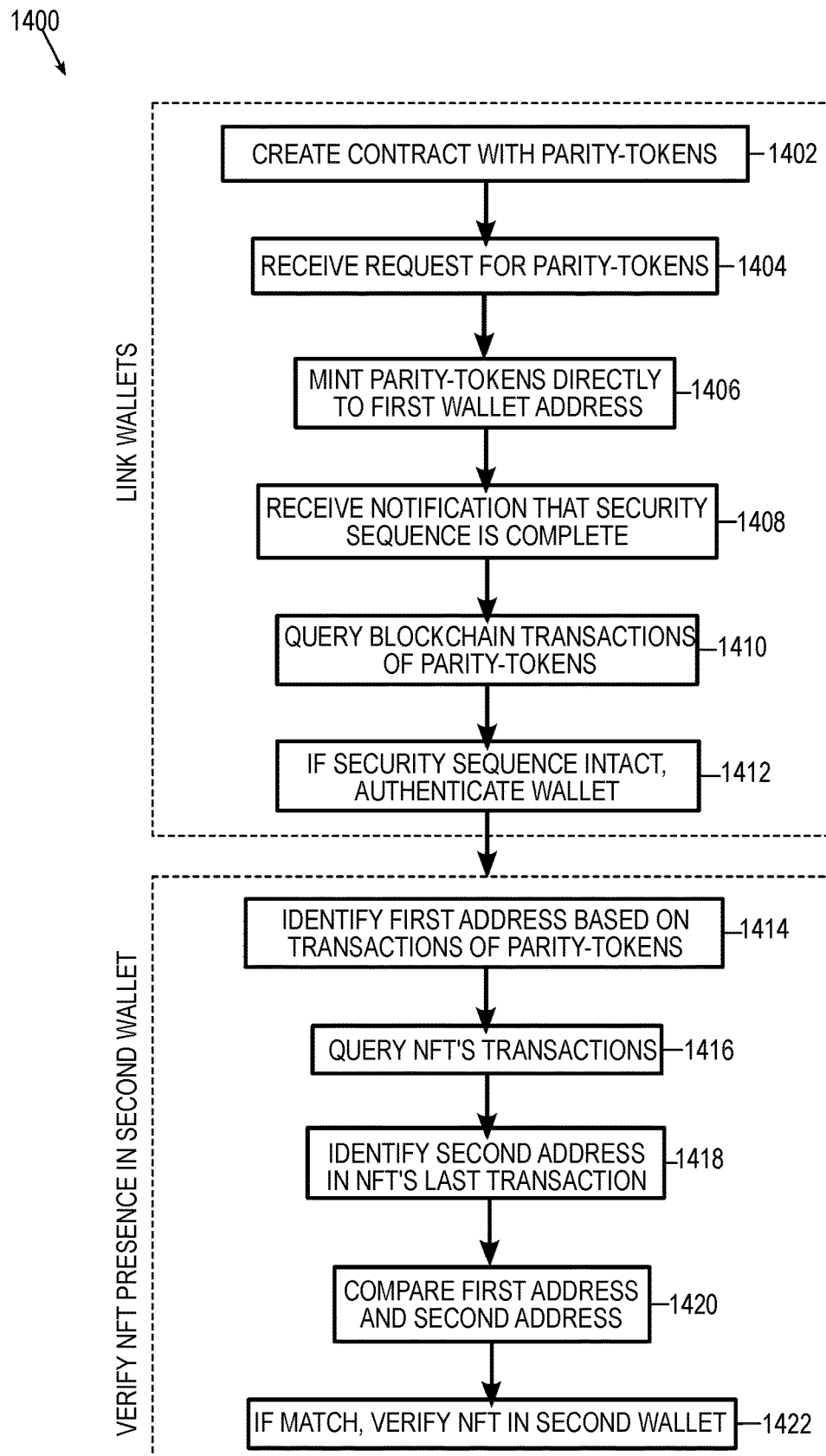
FIG. 14 is a simplified flow diagram showing example operations for linking blockchain wallets via entangled parity-tokens and verifying non-fungible tokens according to some embodiments of the present disclosure.

FIG. 14 is a schematic flow diagram showing various operations 1400 that may be associated with system 100 according to some embodiments of the present disclosure. At 1402, contract 112 with unassigned tokens 304 may be created in blockchain network 110 by server 104. Creating contract 112 may comprise broadcasting contract 112 to blockchain network 110, after which validator nodes 1004 may validate and add contract 112 to the blockchain suitably. In some embodiments, validator nodes 1004 may use cryptographic hashes to secure and join contract 112 to the blockchain. At 1404, server 104 may receive a request for plurality of parity-tokens 116. In some embodiments, the request may be received from user-device 102. In some other embodiments, the request may be received from a wallet application 1121 executing in cloud network 202 and communicably coupled to server 104. In yet other embodiments, the request may be received from a wallet application 1121 executing in user-device 102 and communicably coupled to server 104. In various embodiments, the request may include first wallet address 602*a* of first wallet 106*a*. In other embodiments, first wallet address 602*a* may be communicated to server 104 in a separate communication (e.g., signed transaction 108 from user-device 102) previously. In some embodiments, the request may include the number of parity-tokens 116 to be minted. In various embodiments, signed transaction 108 merely facilitates providing the wallet address of wallet 106*a* to server 104. It does not give server 104 permission to access contents of wallet 106*a*; nor does it give server 104 any other type of control of wallet 106*a*. Thus, user credentials are not custodialized, so that credentials to access wallet 106*a* are not requested or provided to server 104 by user-device 102.

At 1406, server 104 may sign transaction 402*a* to mint plurality of parity-tokens 116 directly to first wallet address 602*a*. In various embodiments, minting may comprise the following actions: Server 104 may generate transaction 402*a* by adding first wallet address 602*a* to the owner ID attribute of the data structures of individual ones in the plurality of parity-tokens 116. Server 104 may thereafter sign and broadcast transaction 402*a* to blockchain network 110. Signing the transaction may comprise logging into blockchain network 110 using a private key or other cryptographic or network credentials of server 104. Validator nodes 1004 may validate and add transaction 402*a* to blockchain network, assigning transaction ID 404*a* thereto.

At 1408, server 104 may receive a notification that security sequence 120 is completed. Note that at the time of notification, or thereafter, second wallet 106*b* need not be physically connected to, or in communication with, blockchain network 110. In some embodiments, the notification may be received from user-device 102. In some embodiments, the notification may be received by way of wallet application 1121 executing at least partially in user-device 102. At 1410, server 104 may query blockchain transactions 402 of plurality of parity-tokens 116 to verify that security sequence 120 is intact. In various embodiments, for example, as described in reference to FIG. 4, blockchain transactions 402 in security sequence 120 of plurality of parity-tokens 116 may include transactions 402*a* minting plurality of parity-tokens 116 to first wallet 106*a*, transaction 402*b* transferring parity-token 116*a* from first wallet 106*a* to second wallet 106*b*, transaction 402*c* transferring parity-token 116*b* from first wallet 106*a* to second wallet 106*b*, and transaction 402*d* transferring parity-token 116*a* from second wallet 106*b* to first wallet 106*a*. In some embodiments with more number of wallets 106 to be linked, security sequence 120 may include proportionally more number of transactions. Server 104 may inspect transactions 402 of security sequence 120 and make a determination whether security sequence 120 is intact. Security sequence 120 may be determined to be intact if there are no more than the maximum expected number of transactions, and plurality of parity-tokens 116 are simultaneously at wallets 106 to be linked.

At 1412, based on the determination that security sequence 120 is intact, server 104 may authenticate second wallet 106b and link first wallet 106a and second wallet 106b. Authenticating comprises confirming that second wallet 106b exists and is associated with first wallet 106a through a common owner-user. In other words, the common owner-user has access to and control over both first wallet 106a and second wallet 106b. The confirmation may be by identifying respective wallet addresses 602a and 60b of first wallet 106a and second wallet 106b in transactions of security sequence 120. The access and control are shown by the acts of transferring parity-tokens 116a and 116b from and to first wallet 106a and second wallet 106b identified by their respective wallet addresses 602a and 602b.

Linking comprises an association of respective wallet addresses 602a and 602b of linked first wallet 106a and second wallet 106b whereby any one of the associated wallet addresses (e.g., first wallet address 602a) can be used to identify all the other associated wallet addresses (e.g., second wallet address 602b). The linking is configured to facilitate querying of blockchain data such that first wallet address 602a or second wallet address 602b can be used to verify contents at first wallet 106a and second wallet 106b subsequent to the linking. Thus, to verify (e.g., confirm, check, prove, attest) contents of all (or any) linked wallets 106 thereafter, transactions may be queried using any one of the linked wallet addresses. In other words, only one linked wallet address can be used to verify the contents of all linked wallets. For example, contents of second wallet 106b can be verified by knowing first wallet address 602a.

At 1414, server 104 may retrieve a first address from transactions 402 of plurality of parity-tokens 116. In an example embodiment, server 104 may retrieve the first address in response to a request to verify a location of selected NFT 502, the request including first wallet address 602a. Server 104 may query transactions 402 based on first wallet address 602a and determine that selected NFT 502 is not at first wallet 106s. Server 104 may then make a determination that first wallet address 602a is linked to second wallet address 602b by the existence of plurality of parity-tokens 116 at first wallet 106a and second wallet 106b. Server 104 may parse transactions 402 to retrieve second wallet address 602b therefrom and assign the value to the first address. In other words, the first address is assigned the value of second wallet address 602b of second wallet 106b. At 1416, server 104 may query transactions 402 of selected NFT 502. At 1418, server 104 may identify a second address from transaction 402f of selected NFT 502, which may be a last transaction (i.e., there are no further transactions temporally in the blockchain associated with transferring selected NFT 502.). At 1420, server 104 may compare the first address identified in operation 1414 and the second address identified in operation 1418 to determine a match. At 1422, responsive to a determination that the first address identified in operation 1414 and the second address identified in operation 1418 match, selected NFT 502 may be verified to be in second wallet 106b.

In some embodiments, operations 1414-1422 may be performed subsequent to operations 1402-1412 without any limitation as to the time elapsed in-between. In some embodiments, after first wallet 106a and second wallet 106b are linked at operation 1412, any number of selected NFT 502 may be verified immediately thereafter by repeating operations 1416-1420 suitably. If a long time (e.g., time sufficient to move NFTs from one wallet to another, minutes, hours, etc.) elapses between linking first wallet 106a and second wallet 106b, operations 1410-1422 may be repeated for every selected NFT 502 to be verified (i.e., wallets 106 may be re-linked, or the links verified as appropriate).

Figure 15:
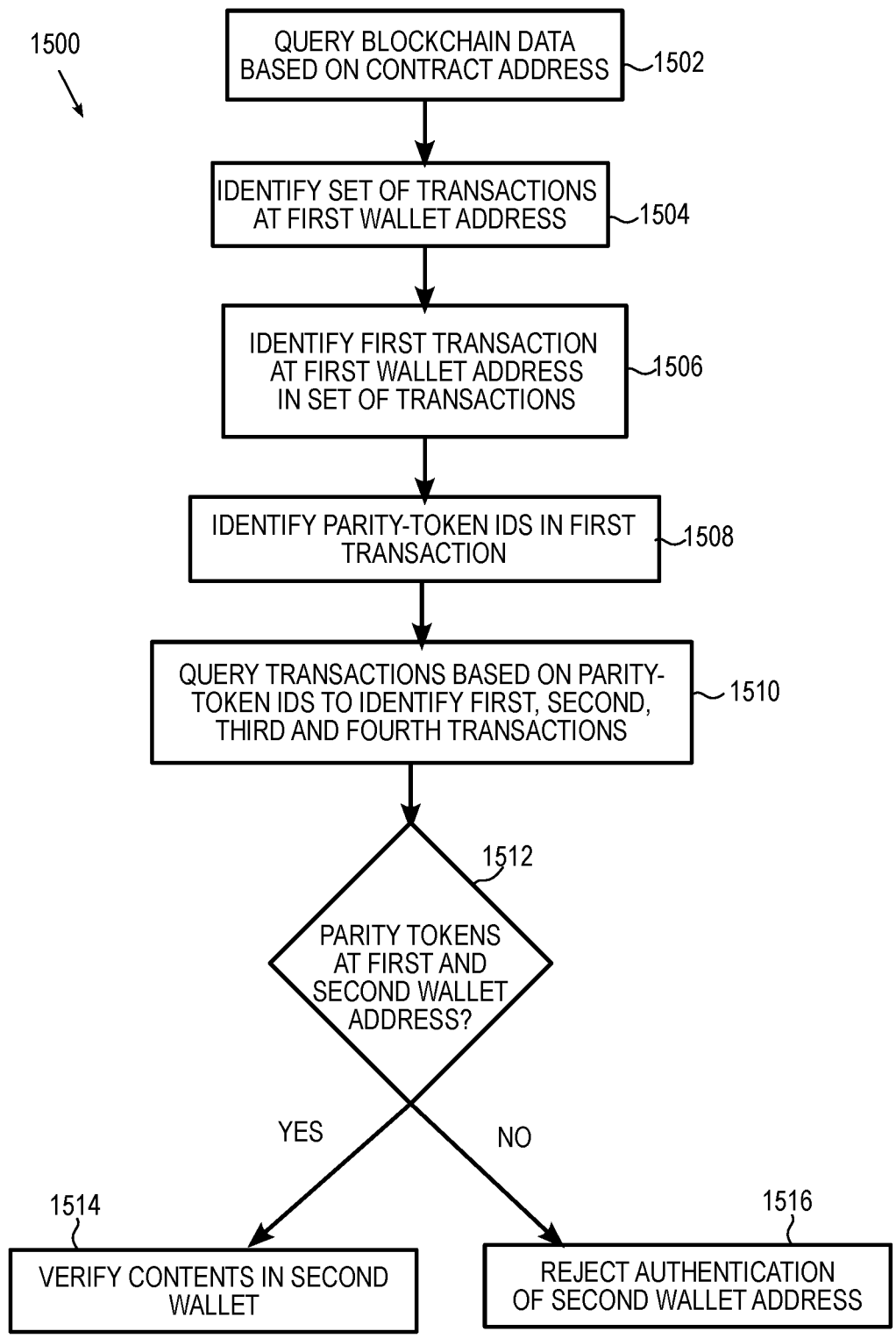
FIG. 15 is a simplified flow diagram showing other example operations for linking blockchain wallets via entangled parity-tokens according to some embodiments of the present disclosure.

FIG. 15 is a schematic flow diagram showing various operations 1500 for linking wallets 106 in system 100 according to some embodiments of the present disclosure. At 1502, blockchain data may be queried based on contract address 114 for transactions 402. In some embodiments, the querying may comprise using an appropriate blockchain reader, and searching with contract address 114 as the search term. At 1504, a set of transactions 402 may be identified associated with contract address 114 at first wallet address 602a. At 1506, first transaction 402a (i.e., minting transaction) at first wallet address 602a may be identified in the set of transactions 402. In some embodiments, first transaction 402a may be identified by parsing the set of transactions 402 using first wallet address 602a as the search term. At 1508, parity-tokens IDs 702 minted in first transaction 402a may be identified, for example, by looking up the token ID attribute value in the data structure of plurality of parity-tokens 116 indicated in first transaction 402a.

At 1510, the blockchain data may be separately queried based on parity-token IDs 702 (and contract address 114 as needed) as the search terms for transactions 402 associated therewith to identify first transaction 402a, second transaction 402b, third transaction 402c, and fourth transaction 402d (i.e., to determine whether security sequence 120 was followed). For example, a query may be executed on blockchain data using [contract address, token ID] as the search term. The set of transactions 402 returned in the query may be parsed, counted, and compared with the expected number and type of transactions in security sequence 120 to identify first transaction 402a, second transaction 402b, third transaction 402c, and fourth transaction 402d in some embodiments. At 1512, a determination is made whether, subsequent to fourth transaction 402d, plurality of parity tokens 116 is at first wallet address 602a and second wallet address 602b. In some embodiments, during the determination, the compared transactions (i.e., first transaction 402a, second transaction 402b, third transaction 402c, and fourth transaction 402d) are matched to the expected number and type of transactions in security sequence 120. In some embodiments, responsive to the determination at 1512, at 1514, server 104 may verify contents in second wallet 106b using second wallet address 602b. For example, blockchain data may be queried using second wallet address 602b as the search term. The set of transactions returned in the query may be parsed to identify selected NFT 502, for example, or other contents as appropriate. If the determination at 1512 fails, at 1516, server 104 may reject authentication of second wallet address 602b, and consequently, may not link first wallet 106a and second wallet 106b.

Figure 16:
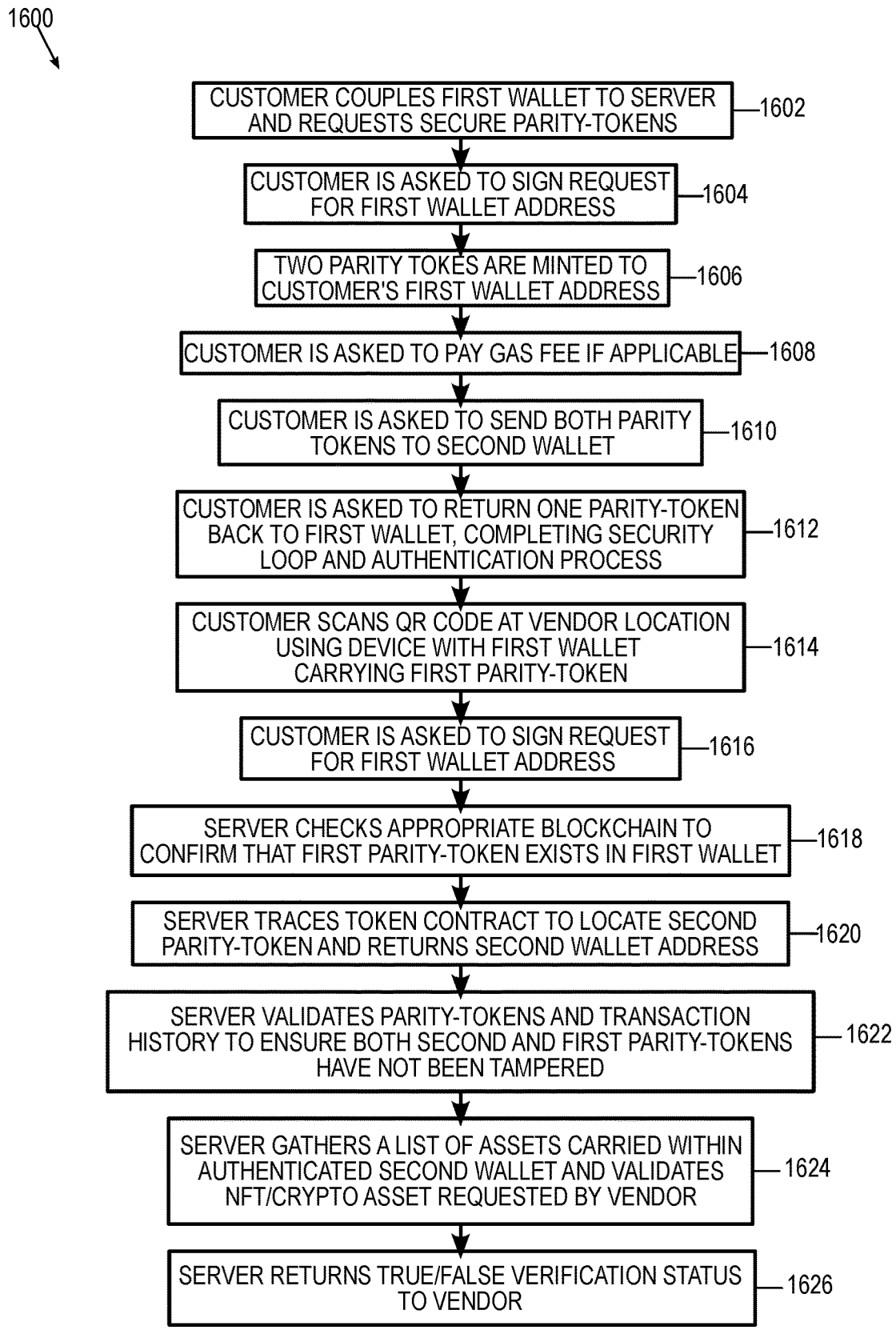
FIG. 16 is a simplified flow diagram showing yet other example operations for linking blockchain wallets via entangled parity-tokens according to some embodiments of the present disclosure.

FIG. 16 is a schematic flow diagram showing various operations 1600 for verifying selected NFT 502 in system 100 according to some embodiments of the present disclosure. At 1602, a customer communicatively couples first wallet 106a to server 104 and requests secure parity-tokens 116. In various embodiments, the request may be entered on a suitable user-interface of a wallet application 1121 or browser and sent to server 104. The customer may select a particular one of several wallets displayed in the user-interface in some embodiments. At 1604, the customer is asked to sign a request for first wallet address 602a. In some embodiments, the customer may be asked by way of a suitable user-interface with a selectable button that, upon selection, sends signed transaction 108 to server 104 with first wallet address 602a therein. At 1606, two identical parity-tokens 116a and 116b are minted to customer provided first wallet address 602a. In many embodiments, parity-tokens 116a and 116b are minted from the same contract 112 in a single minting transaction 402a. At 1608, the customer may be asked to pay a gas fee for minting transaction 402a. The gas fee may be set by contract 112 or by other blockchain rules as appropriate. At 1610, the customer is asked to send both parity-tokens 116a and 116b to second wallet 106b. In various embodiments, a user-interface on the customer's wallet application 1121 or browser may provide the appropriate instructions. At 1612, the customer is asked (e.g., via user-interface of wallet application 1119) to return one parity-token 116a back to first wallet 106a completing security loop and authentication process.

At 1614, the customer may scan a QR-code (or other digital ticket) at a vendor location using a device with access to first wallet 106a carrying parity-token 116a. At 1616, the customer (e.g., user) is asked to sign a request for first wallet address 602a. In various embodiments, the request may be entered on a suitable user-interface of a wallet application 1121 or browser and sent to server 104. At 1618, server 104 checks appropriate blockchain (e.g., Ethereum™, Polygon™, etc.) to confirm that parity-token 116a exists in first wallet 106a. At 1620, server 104 traces contract 112 to locate second parity-token 116b and returns second wallet address 602b. At 1622, server 104 validates parity-tokens 116a and 116b and transaction history thereof to ensure both parity-tokens 116a and 116b have not been tampered (e.g., moved, transferred, destroyed). At 1624, server 104 gathers a list of assets (e.g., NFTs, cryptocurrency, etc.) carried within second wallet 106b and validates the NFT/cryptocurrency asset requested by a vendor. At 1626, server 104 returns a true/false verification status to the vendor.

Although FIGS. 14-16 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 14-16 may be modified in accordance with the present disclosure to link wallets 106 and/or authenticate selected NFT 502 disclosed herein. Although various operations are illustrated in FIGS. 14-16 once each, the operations may be repeated as often as desired. For example, operations 1416 to 1420 in FIG. 14 may be repeated for verifying separate ones of selected NFT 502 in second wallet 106b.

Example Devices and Components

Figure 17:
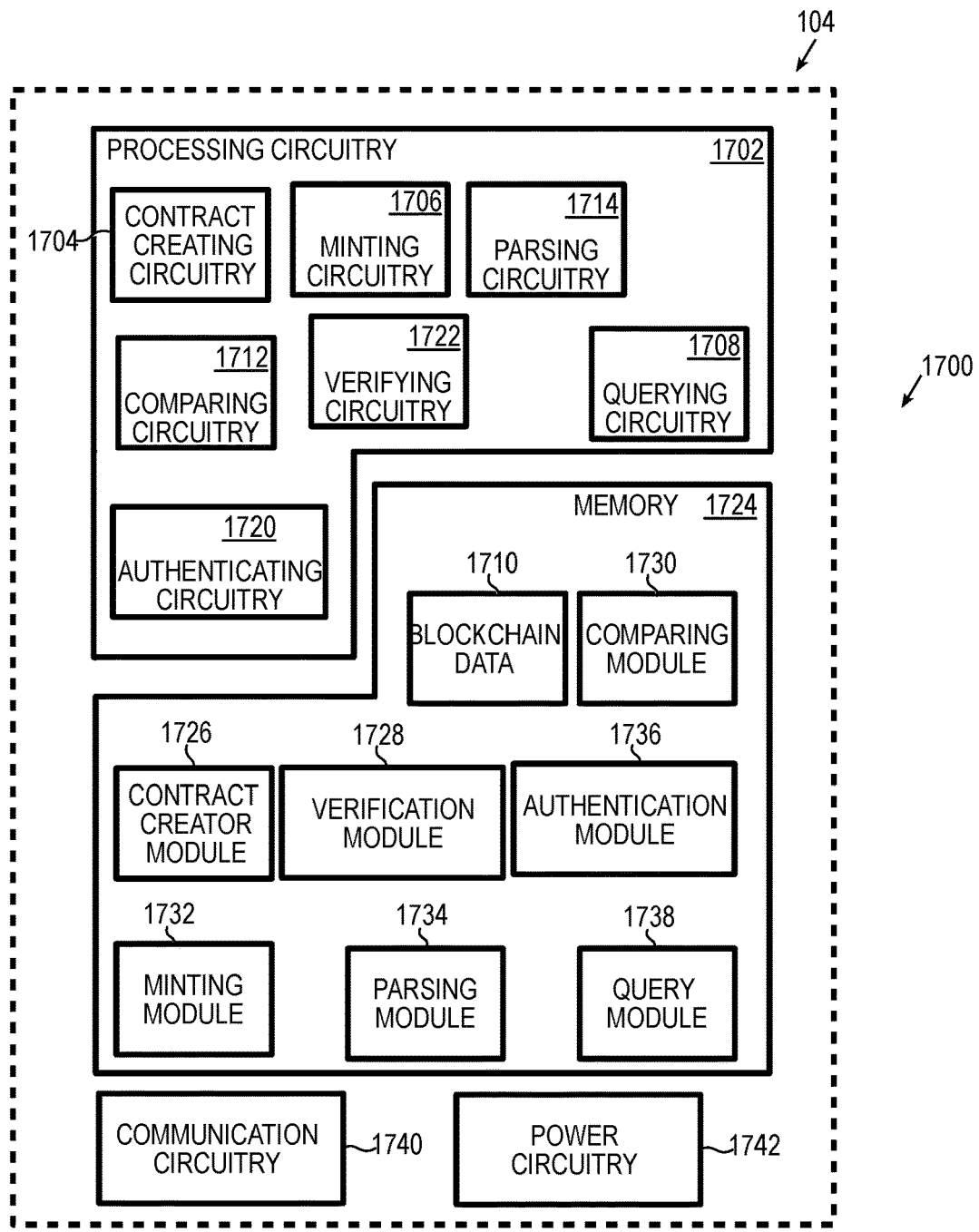
FIG. 17 is a simplified block diagram showing an example computing device in the system for linking blockchain wallets via entangled parity-tokens according to some embodiments of the present disclosure.

The methods and systems disclosed herein, e.g., any of the embodiments shown in FIGS. 1-16 or any further embodiments described herein, may be included in any suitable computing device as shown in FIG. 17. FIG. 17 is a simplified block diagram of an example computing device 1700 that may be included in system 100 of any one of FIGS. 1-16 in accordance with any of the embodiments disclosed herein. For example, server 104 includes computing device 1700 in some embodiments. Computing device 1700 may include a processing circuit (alternatively processing unit) 1702 (e.g., one or more processing devices). As used herein, the term "processing circuit" or "processing unit" may refer to any device or portion of a device that processes electronic data from registers and/or memory to transform that electronic data into other electronic data that may be stored in registers and/or memory. Processing circuit 1702 may include one or more digital signal processors (DSPs), Application Specific Integrated Circuits (ASICs), CPUs, GPUs, crypto-processors (specialized processors that execute cryptographic algorithms within hardware), server processors, or any other suitable processing devices.

In various embodiments, processing circuitry 1702 may include various circuitries configured for performing various functions. For example, a contract creating circuitry 1704 may create contract 112 with unassigned tokens 304 in blockchain network 110. A minting circuitry 1706 may mint plurality of parity-tokens 116 from contract 112 to first wallet address 602a in first transaction 402a. A querying circuitry 1708 may query blockchain data 1710 based on contract address 114 of contract 112 to identify a set of transactions 402. A comparing circuitry 1712 may compare first wallet address 602a with the addresses in the set of transactions 402 returned by querying circuitry 1708 to identify first transaction 402a therein. A parsing circuitry 1714 may parse transaction 402a to identify parity-token identifiers 702. Querying circuitry 1708 may query blockchain data 1710 based on parity-token identifiers 702 to identify first transaction 402a, second transaction 402b, third transaction 402c and fourth transaction 402d. An authenticating circuitry 1720 may determine that security sequence 120 has been followed, and plurality of parity-tokens 116 are simultaneously at first wallet address 602a and second wallet address 602b.

In some embodiments, querying circuitry 1708 may query blockchain data 1710 based on a token identifier of selected NFT 502 to identify transaction 402f. Parsing circuitry 1714 may parse transaction 402f to identify the wallet address of selected NFT 502. Comparing circuitry 1712 may compare the wallet address with second wallet address 602b. If there is a match, a verifying circuitry 1722 may subsequently transmit a message that selected NFT 502 is at second wallet address 602b.

In some other embodiments, querying circuitry 1708 may query blockchain data 1710 based on second wallet address 602b. Parsing circuitry 1714 may parse transaction 402f to identify the token identifier of selected NFT 502. Comparing circuitry 1712 may compare the token identifier with a known value (e.g., received from a request to verify selected NFT 502). If there is a match, verifying circuitry 1722 may subsequently transmit the message that selected NFT 502 is at second wallet address 602b.

Computing device 1700 may include non-transitory computer-readable media such as a memory 1724, which may itself include one or more memory devices such as volatile memory such as dynamic random access memory (DRAM), nonvolatile memory (e.g., read-only memory (ROM)), flash memory, solid-state memory, and/or a hard drive. In some embodiments, memory 1724 may include memory that shares a die with processing circuit 1702. In various embodiments, various data, such as blockchain data 1710 may be stored in memory 1724. In some embodiments, blockchain data 1710 may be stored temporarily. Various code for performing various operations as described herein may be stored in memory element 1724. Such code and the algorithms expressed by them are shown as modules in FIG. 17. Such modules include a contract creator module 1726, a verification module 1728, a comparing module 1730, a minting module 1732, a parsing module 1734, an authentication module 1736, and a query module 1738. Various other modules for operations relevant to the functioning of computing device 1700 may be included in memory element 1724 within the broad scope of the embodiments.

Contract creator module 1726 comprises instructions for creating contract 112. In various embodiments, creating contract 112 comprises broadcasting contract 112 to blockchain network 110, after which validator nodes 1004 may validate and add contract 112 to the blockchain suitably. Contract 112 may be created with a predetermined number of unassigned tokens 304 and relevant rules applicable to their transfer and management. For example, a rule may state that no fewer than two unassigned tokens 304 may be minted at a time in a single transaction. In various embodiments, the instructions stored at contract creator module 1726 may be executed by contract creating circuitry 1704.

Verification module 1728 comprises instructions for evaluating a request against a suitable rule, statements, facts, etc. and related operations. For example, verification module 1728 may evaluate whether selected NFT 502 is at second wallet address 602b by parsing a last transaction 402f associated with selected NFT 502, identifying a wallet address 602 therein, receiving confirmation that the wallet address matches second wallet address 602b and transmitting a suitable verification message (e.g., "NFT verified"). In another embodiment, verification module 1728 may parse transactions 402 involving second wallet address 602b to determine whether transfer of selected NFT 502 to second wallet 106b is included therein. In various embodiments, the instructions stored at verification module 1728 may be executed by verifying circuitry 1722.

Comparing module 1730 comprises instructions for comparing two terms. In various embodiments, any suitable algorithm for comparing may be used, including Hamming Distance, Levenshtein Distance, Jaro-Winkler, Jaccard Index, Sorensen-Dice, Ratcliff-Obershelp, etc. for string similarity searching. For example, comparing module 1730 may compare a last known wallet address of selected NFT 502 with second wallet address 602b to determine a match. In another example embodiment, comparing module 1730 may compare first wallet address 602a with the addresses in a set of transactions 402 returned by a query of contract address 114 of contract 112 used to mint plurality of parity-tokens 116. In various embodiments, the instructions stored at comparing module 1730 may be executed by comparing circuitry 1712.

Minting module 1732 comprises instructions for assigning suitable owner IDs to plurality of parity-tokens 116 from contract 112 to originate transaction 402a, and broadcasting transaction 402a to blockchain network 110, after which validator nodes 1004 may validate and add transaction 402a to the blockchain suitably. Assigning suitable owner IDs comprises writing the relevant owner ID, for example, wallet address 602, to an appropriate attribute value of the data structures representing individual ones in plurality of parity-tokens 116. In various embodiments, the instructions stored at minting module 1732 may be executed by minting circuitry 1706.

Parsing module 1734 comprises instructions for parsing transactions 402 to identify specific terms, transactions, etc. and extract relevant information as needed. For example, parsing module 1734 may parse transactions 402 to identify first transaction 402a minting parity-tokens 116a and 116b to first wallet address 602a, second transaction 402b transferring parity-token 116a from first wallet address 602a to second wallet address 602b and third transaction 402c transferring parity-token 116b from second wallet address 602b back to first wallet address 602a. Parsing module 1734 may include rules for identifying data types and relevant values, so as to enable parsing module 1734 to identify transaction identifiers 404, parity-token IDs 702, wallet addresses 602, etc. in a list of transactions 402. In various embodiments, the instructions stored at parsing module 1734 may be executed by parsing circuitry 1714.

Authentication module 1736 comprises instructions for confirming that second wallet 106b exists and is associated with first wallet 106a through a common owner-user who may be identified, verified, authenticated etc. by the private key used to generate signed transaction 108. Authenticating may include algorithms for identifying, comparing, verifying, etc. relevant to the operations and/or needs as appropriate. In some embodiments, authentication module 1736 comprises instructions for making a determination including by algorithms such as conditional IF-ELSE, IF-THEN, etc. In some embodiments, if a conditional statement is true, a certain result may be assigned; if the conditional statement is false, certain other results may be assigned. For example, authentication module 1736 may determine whether security sequence 120 comprises minting of plurality of parity-tokens 116 to first wallet 106a, transfer of plurality of parity-tokens 116 from first wallet 106a to second wallet 106b, and transfer of one in plurality of parity-tokens 116 from second wallet 106b to first wallet 106a. In various embodiments, the instructions stored at authentication module 1736 may be executed by authenticating circuitry 1720.

Query module 1738 comprises instructions for querying blockchain data based on certain query terms, such as contract address 114, transaction ID 404, parity-token ID 702, wallet address 602, etc. Any suitable algorithm for querying, such as adaptive spatiotemporal blockchain index method, materializing the data of the blockchain in a standard database format, verifiable Boolean range queries, etc. may be used within the broad scope of the embodiments. In various embodiments, the instructions stored at query module 1738 may be executed by querying circuitry 1708.

In some embodiments, computing device 1700 may include a communication circuitry 1740 comprising one or more communication chips. For example, communication circuitry 1740 may be configured for managing wireless communications for the transfer of data to and from computing device 1700. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

Communication circuitry 1740 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), LTE project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. Communication circuitry 1740 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 1740 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 1740 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 1740 may operate in accordance with other wireless protocols in other embodiments. Communication circuitry 1740 may include antennas to facilitate wireless communications and/or to receive other wireless communications.

In some embodiments, communication circuitry 1740 may manage wired communications, such as electrical, optical, or any other suitable communication protocols (e.g., the Ethernet, Internet). As noted above, communication circuitry 1740 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

In various embodiments, signed transaction 108 may be received at computing device 1700 by communication circuitry 1740. In various embodiments, verification messages may be broadcast from computing device 1700 by communication circuitry 1740. In various embodiments, broadcasting of transactions to blockchain network 110 may be performed by communication circuitry 1740.

Computing device 1700 may include a power circuitry 1742 comprising battery/power circuitry and other electronic components configured to deliver power to computing device 1700. Power circuitry 1742 may include one or more energy storage devices (e.g., batteries or capacitors) and/or circuitry for coupling components of computing device 1700 to an energy source separate from computing device 1700 (e.g., AC line power).

A number of components are illustrated in the figure as included in computing device 1700, but any one or more of these components may be omitted or duplicated, as suitable for the application. Additionally, in various embodiments, computing device 1700 may not include one or more of the components illustrated in the figure, but computing device 1700 may include interface circuitry for coupling to one or more components. For example, computing device 1700 may not include a display device, but may include display device interface circuitry (e.g., a connector and driver circuitry) to which display device 2406 may be coupled. In some embodiments, computing device 1700 may include peripheral components, such as display devices, keyboard, mouse, audio input/output devices, bar code reader, a Quick Response (QR) code reader, sensors, radio frequency identification (RFID) reader, etc. Display devices may include any visual indicators, such as a heads-up display, a computer monitor, a projector, a touchscreen display, a liquid crystal display (LCD), a light-emitting diode display, or a flat panel display, for example.

Computing device 1700 may have any desired form factor, such as a handheld or mobile computing device (e.g., a cell phone, a smart phone, a mobile Internet device, a tablet computer, a laptop computer, a netbook computer, an ultrabook computer, a personal digital assistant (PDA), an ultramobile personal computer, etc.), a desktop computing device, a server or other networked computing component, a set-top box, an entertainment control unit, a vehicle control unit, or a wearable computing device. In some embodiments, computing device 1700 may be any other electronic device that processes data.

Figure 18:
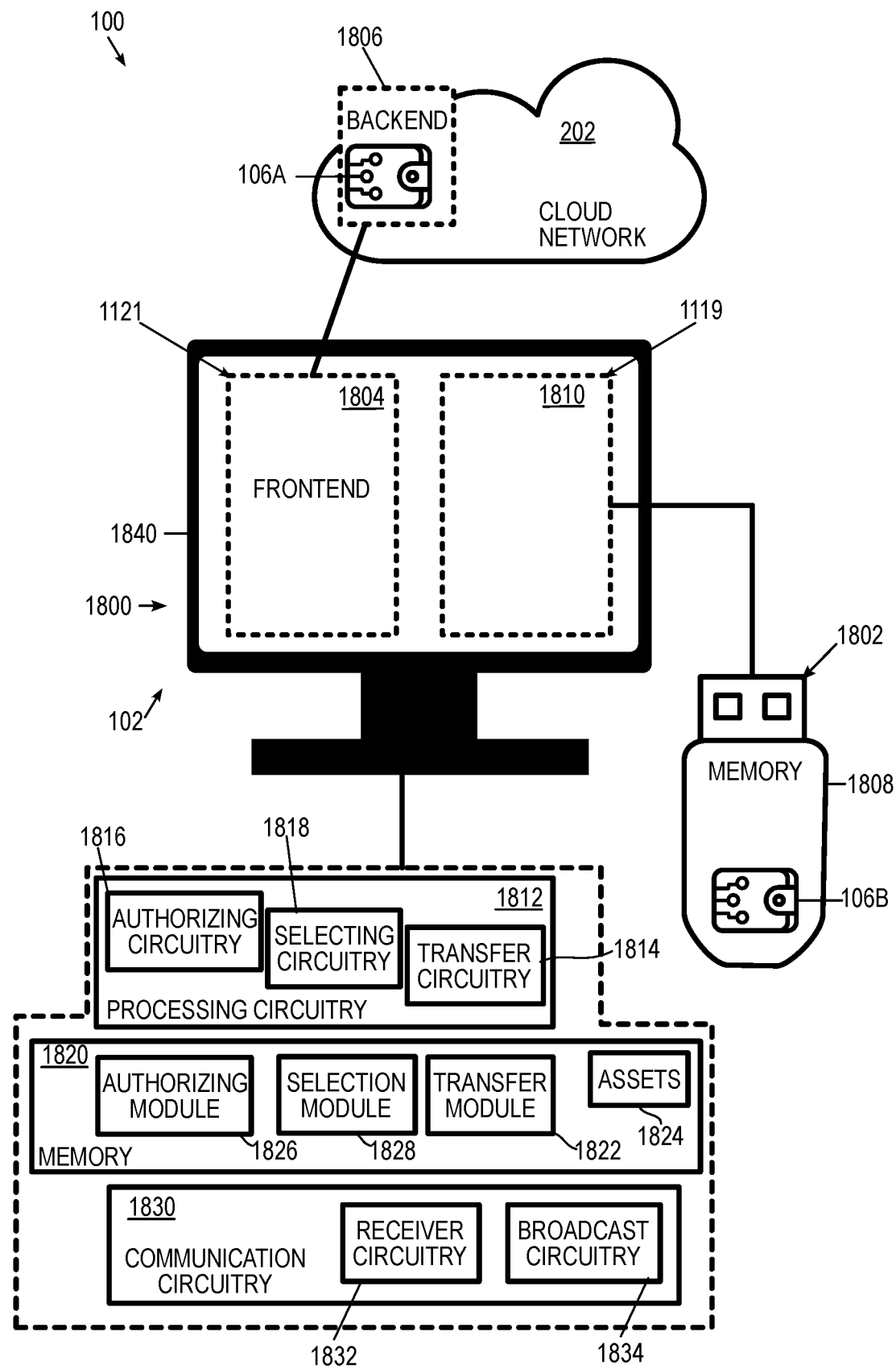
FIG. 18 is a simplified block diagram showing another example computing device in the system for linking blockchain wallets via entangled parity-tokens according to some embodiments of the present disclosure.

FIG. 18 is a simplified block diagram of an example computing device 1800 that may be included in system 100 of any one of FIGS. 1-16 in accordance with any of the embodiments disclosed herein. For example, user-device 102 includes computing device 1800 in some embodiments. Computing device 1800 may have any desired form factor, such as a handheld or mobile computing device (e.g., a cell phone, a smart phone, a mobile Internet device, a tablet computer, a laptop computer, a netbook computer, an ultrabook computer, a PDA, an ultramobile personal computer, etc.), a desktop computing device, a server or other networked computing component, a set-top box, an entertainment control unit, a vehicle control unit, or a wearable computing device. In some embodiments, computing device 1800 may be any other electronic device that processes data. Further, computing device 1800 may include components similar to those shown in reference to computing device 1700 of FIG. 17. Examples of such components that are included but not shown in the figure so as not to clutter the drawing include one or more processing circuits and memory.

In various embodiments, a hardware device 1802 external to (i.e., not integrated with) computing device 1800 may be configured to be coupled to computing device 1800. Hardware device 1802 may be of any type, including USB flash drive, hard-disk device (HDD), pen drives, Compact Disc (CD) drive, etc. configured to be connected to computing device 1800 suitably. When coupled to computing device 1800, hardware device 1802 may be configured to be operated on as though it is an integrated part of computing device 1800 in some embodiments.

First wallet 106a may be implemented in system 100 either wholly in computing device 1800 (not shown), or partially as shown, with a frontend 1804 at computing device 1800 and a backend 1806 executing remotely in cloud network 202. Wallet application 1121 associated with first wallet 106a may provide a suitable user-interface for frontend 1804 that facilitates interaction by a user with the functionalities of first wallet 106a. For example, the user may send signed transaction 108 from computing device 1800 using suitable command modules (e.g., command line interface (CLI), user-interface buttons, etc.) available in frontend 1804 of wallet application 1121. In some embodiments, frontend 1804 may be a plug-in to a browser, such as Edge™, Chrome™, Firefox™, etc. In some other embodiments, frontend 1804 may be a standalone client application. Wallet application 1121 may provide a suitable user-interface for backend 1806 that may not be available to the owner-user of wallet application 106a but may be accessible to developers and other service providers maintaining wallet application 1121 in cloud network 202. Backend 1806 may execute in a server, virtual machine, or other suitable computing device in cloud network 202. In various embodiments, tokens in first wallet 106a may be stored in memory elements of the computing device in cloud network 202 rather than the memory elements in hardware device 1802. Any instructions regarding such tokens, such as transfer of the tokens, may be initiated at frontend 1804 and completed at backend 1806.

Second wallet 106b may be implemented in system 100 in hardware device 1802 with a user-interface 1810 of wallet application 1119 at computing device 1800 and a memory element 1808 in hardware device 1802. User-interface 1810 may facilitate interaction by a user with the functionalities of second wallet 106*b*. For example, the user may transfer tokens stored in second wallet 106*b* by using suitable command modules (e.g., CLI, user-interface buttons, etc.) available in in user-interface 1810. In some embodiments, user-interface 1810 may be a plug-in to a browser, such as Edge™, Chrome™, Firefox™, etc. In some other embodiments, user-interface 1810 may be a standalone client application. In various embodiments, tokens in second wallet 106*b* may be stored in memory element 1808 of hardware device 1802. Any instructions regarding such tokens, such as transfer of the tokens, may be initiated and completed at user-interface 1810 by wallet application 1119.

In various embodiments, computing device 1800 may include processing circuitry 1812. Embodiments of processing circuitry 1812 may be as discussed in reference to processing circuitry 1702 of FIG. 17. Further, processing circuitry 1812 may include a transfer circuitry 1814. In various embodiments, transfer circuitry 1814 may be configured to transfer one or more individual ones in plurality of parity-tokens 116 to a specified wallet address, for example, first wallet address 602*a*, or second wallet address 602*b* as desired. In various embodiments, transfer circuitry 1814 may rewrite the owner ID value in the data structure of parity-tokens 116*a* and/or 116*b* with the desired wallet address 602, for example, first wallet address 602*a* or second wallet address 602*b* and broadcast the transaction to blockchain network 110. Processing circuitry 1812 may include authorizing circuitry 1816 configured to generate signed transaction 108, for example, to permit first wallet address 602*a* to be communicated to server 104. In some embodiments, authorizing circuitry 1816 may include circuitry to authenticate first wallet 102*a* and/or second wallet 102*b* appropriately (e.g., using private keys, passwords, etc.). Processing circuitry 1812 may further include a selecting circuitry 1818 configured to select one or assets 1824, including one or more individual ones in plurality of parity-tokens 116.

In various embodiments, computing device 1800 may include memory 1820, which may comprise components as described in reference to memory 1724 of FIG. 17. Further, memory 1820 may include a transfer module 1822 and one or more assets 1824, including parity-tokens 116. In various embodiments, transfer module 1822 may comprise instructions to transfer one or more individual ones in plurality of parity-tokens 116 to a specified wallet address, for example, first wallet address 602*a*, or second wallet address 602*b* as desired. In various embodiments, transfer module 1822 may comprise instructions to rewrite the owner ID value in the data structure of parity-tokens 116*a* and/or 116*b* with the desired wallet address 602, for example, first wallet address 602*a* or second wallet address 602*b* and broadcast the transaction to blockchain network 110. In various embodiments, memory 1820 may further include an authorizing module 1826 comprising instructions to generate signed transaction 108, for example, to permit first wallet address 602*a* to be communicated to server 104. In some embodiments, authorizing circuitry 1816 may include circuitry to authenticate first wallet 102*a* and/or second wallet 102*b* appropriately (e.g., using private keys, passwords, etc.). Memory 1820 may further include a selection module 1828 comprising instructions to select one or assets 1824, including one or more individual ones in plurality of parity-tokens 116.

In various embodiments, computing device 1800 may include a communication circuitry 1830, as described in reference to communication circuitry 1740 of FIG. 17. Communication circuitry 1830 may include a receiver circuitry 1832 configured to receive information regarding transactions 402 in blockchain network 110, include transactions 402*a*, or requests from server 104, for example, for first wallet address 602*a*, etc. In various embodiments, receiver circuitry 1832 may be configured for receiving, at first wallet address 602*a*, plurality of parity-tokens 116 minted in transaction 402*a* from contract address 114, and subsequent to transaction 402*b* (and 402*c* in some embodiments), receiving parity-token 116*a* in transaction 402*d*, transferring parity-token 116*a* from second wallet address 602*b* to first wallet address 602*a*. In some embodiments, receiver circuitry 1832 may be for receiving, at first wallet address 602*a*, plurality of parity-tokens 116 in transaction 402*b* (and 402*c* in some embodiments) from first wallet address 602*a*.

In various embodiments, communication circuitry 1830 may comprise a broadcast circuitry 1834 configured to broadcast transactions 402 to blockchain network 110, for example, transactions 402*b*, 402*c*, 402*d*, etc. based on particular needs. In various embodiments, broadcast circuitry 1834 may be for broadcasting, from a node (e.g., member node 1002 or validator node 1004) in blockchain network 110, transaction 402*b* (and 402*c* in some embodiments) subsequent to transaction 402*a*, transferring plurality of parity-tokens 116 from first wallet address 602*a* to second wallet address 602*b*. In some embodiments, broadcast circuitry 1834 may be for broadcasting, from a node (e.g., member node 1002 or validator node 1004) in blockchain network 110, transaction 402*d* subsequent to transaction 402*b* (and/or 402*c*), transferring parity-token 116*a* from second wallet address 602*b* to first wallet address 602*a*.

In various embodiments, communication circuitry 1830 may communicate with backend 1806 in cloud network 202. Computing device 1800 may further include any suitable display device 1840 in which user-interfaces of wallet applications 1119 and 1121 may be displayed. Display device 1840 may be, by way of examples and not as limitations, computer monitor, smartphone display, etc. depending on the type and format of computing device 1800.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for verifying contents of multiple wallets in a blockchain network through linking the wallets via entangled parity-tokens, the method executed by processing circuitry of a server, the method comprising:
   querying blockchain data based on parity-token identifiers to identify:
   a first transaction minting a plurality of parity-tokens identifiable by the parity-token identifiers to a first wallet having a first wallet address;
   a second transaction subsequent to the first transaction, the second transaction transferring an individual one in the plurality of parity-tokens from the first wallet address to a second wallet having a second wallet address;
   a third transaction subsequent to the second transaction, the third transaction transferring another individual one in the plurality of parity-tokens from the first wallet address to the second wallet address; and a fourth transaction subsequent to the second transaction or the third transaction, the fourth transaction transferring any individual one in the plurality of parity-tokens from the second wallet address to the first wallet address;

querying the blockchain data for any other transaction subsequent to the fourth transaction associated with the parity-tokens at the first wallet address and the second wallet address; and responsive to (a) identifying the first, second, and third, and fourth transactions, and (b) determining that the blockchain data does not show any other transaction subsequent to the fourth transaction associated with the parity-tokens at the first wallet address and the second wallet address, reading contents in the second wallet.

2. The method of claim 1, further comprising:
querying blockchain data based on a contract address to identify a set of transactions, the contract address identifying a contract configured to mint the plurality of parity-tokens;
identifying the first transaction at the first wallet address in the set of transactions; and
identifying the parity-token identifiers in the first transaction, the parity-token identifiers corresponding to respective ones in the plurality of parity-tokens minted to the first wallet address.

3. The method of claim 2, further comprising creating the contract in the blockchain network, wherein the contract address is assigned to the contract upon validation by the blockchain network.

4. The method of claim 2, further comprising minting the plurality of parity-tokens to the first wallet address from the contract in the first transaction, wherein individual ones in the plurality of parity-tokens share the contract address and a transaction identifier of the first transaction.

5. The method of claim 1, wherein the second transaction and the third transaction have identical transaction identifiers.

6. The method of claim 1, wherein subsequent to the fourth transaction, the second wallet is disconnected from the blockchain network.

7. The method of claim 1, wherein:
one or more wallets are communicatively coupled to the blockchain network between the first wallet having the first wallet address and the second wallet having the second wallet address,
the one or more wallets are identified by corresponding wallet addresses,
the second transaction and the third transaction comprise a plurality of sequential transactions transferring individual ones in the plurality of parity-tokens from one wallet address to another, and
the method further comprises:
determining whether subsequent to the fourth transaction, an individual one in the plurality of parity-tokens is retained at each of the first wallet, the second wallet and the one or more wallets; and
responsive to determining that an individual one in the plurality of parity-tokens is retained at each of the first wallet address, the second wallet address and the one or more wallet addresses, verifying contents in the one or more wallets using the corresponding wallet addresses.

8. The method of claim 1, further comprising:
receiving a request to verify a location of a non-fungible token (NFT), the request comprising the first wallet address;
identifying the second wallet address based on any one of the second transaction, the third transaction and the fourth transaction of the plurality of parity-tokens, wherein the second wallet address is a first address;
querying blockchain data based on an identifier of the NFT for transactions associated with transferring the NFT;
identifying a second address in a last transaction associated with transferring the NFT;
determining whether the first address matches the second address; and
responsive to determining that the first address matches the second address, transmitting a message verifying presence of the NFT at the second wallet identified by the second wallet address.

9. The method of claim 1, wherein the first wallet address is a public wallet address and the second wallet address is a cold storage wallet address.

10. A method for linking multiple wallets in a blockchain network via entangled parity-tokens, the method executing in a wallet application of a computing device in the blockchain network, the method executed by a processing circuitry of the computing device, the method comprising:
receiving, from a first wallet address at a second wallet address, a plurality of parity-tokens in a first transaction, wherein the parity-tokens share a common identifier; and
broadcasting, from a node in the blockchain network, a second transaction subsequent to the first transaction, wherein:
the second transaction comprises transferring one token in the plurality of parity-tokens from the second wallet address to the first wallet address, and
the one token in the plurality of parity-tokens at the first wallet address and at least another token in the plurality of parity-tokens at the second wallet address are not associated with any other transaction subsequent to the second transaction.

11. The method of claim 10, wherein the plurality of parity-tokens is minted from a contract in a third transaction.

12. The method of claim 11, wherein a combination of a contract address of the contract and a transaction identifier of the third transaction is the common identifier.

13. The method of claim 10, wherein any other transaction that is subsequent to the second transaction and is associated with the at least another token in the plurality of parity-tokens retained at the second wallet address unlinks the second wallet address from the first wallet address.

14. The method of claim 10, further comprising displaying the second wallet address in a user-interface.

15. A method for linking multiple wallets in a blockchain network via entangled parity-tokens, the method executing in a wallet software application of a computing device, the method executed by processing circuitry of the computing device, the method comprising:
receiving, at a first wallet address in the blockchain network, a plurality of parity-tokens minted in a first transaction from a contract address, wherein the parity-tokens share a common identifier;
broadcasting, from a node in the blockchain network, a second transaction subsequent to the first transaction, wherein the second transaction comprises transferring the plurality of parity-tokens from the first wallet address to a second wallet address; and
receiving, at the first wallet address, one token in the plurality of parity-tokens in a third transaction subsequent to the second transaction, wherein:

the third transaction comprises transferring the one of the plurality of parity-tokens from the second wallet address to the first wallet address, and the one token in the plurality of parity-tokens at the first wallet address and at least another token in the plurality of parity-tokens at the second wallet address are not associated with any other transaction subsequent to the third transaction.

16. The method of claim 15, wherein the common identifier is a combination of the contract address and a transaction identifier of the first transaction.

17. The method of claim 15, further comprising:
receiving, from an authenticator application executing in a remote server, a request for the first wallet address; and in response to the request, transmitting the first wallet address to the authenticator application in a signed transaction.

18. The method of claim 15, wherein the at least another token in the plurality of parity-tokens is retained at the second wallet address subsequent to the third transaction.

19. The method of claim 15, further comprising displaying the first wallet address in a user-interface.

\* \* \* \* \*